United States Patent
Ito et al.

(10) Patent No.: US 12,155,074 B2
(45) Date of Patent: Nov. 26, 2024

(54) CONDUCTIVE MATERIAL DISPERSION LIQUID FOR ELECTROCHEMICAL DEVICE, SLURRY COMPOSITION FOR ELECTROCHEMICAL DEVICE ELECTRODE AND METHOD OF PRODUCING SAME, ELECTRODE FOR ELECTROCHEMICAL DEVICE, AND ELECTROCHEMICAL DEVICE

(71) Applicant: ZEON CORPORATION, Tokyo (JP)

(72) Inventors: Yukie Ito, Tokyo (JP); Junpei Motoki, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 8 days.

(21) Appl. No.: 18/040,424

(22) PCT Filed: Aug. 26, 2021

(86) PCT No.: PCT/JP2021/031416
§ 371 (c)(1),
(2) Date: Feb. 3, 2023

(87) PCT Pub. No.: WO2022/045267
PCT Pub. Date: Mar. 3, 2022

(65) Prior Publication Data
US 2023/0299298 A1 Sep. 21, 2023

(30) Foreign Application Priority Data
Aug. 31, 2020 (JP) ................ 2020-146304

(51) Int. Cl.
| | |
|---|---|
| *H01M 4/62* | (2006.01) |
| *C09D 5/24* | (2006.01) |
| *C09D 7/20* | (2018.01) |
| *C09D 7/45* | (2018.01) |
| *C09D 7/62* | (2018.01) |
| *C09D 7/65* | (2018.01) |
| *C09D 7/80* | (2018.01) |
| *C09D 147/00* | (2006.01) |
| *H01G 11/36* | (2013.01) |
| *C08K 9/02* | (2006.01) |

(52) U.S. Cl.
CPC .............. *H01M 4/625* (2013.01); *C09D 5/24* (2013.01); *C09D 7/20* (2018.01); *C09D 7/45* (2018.01); *C09D 7/62* (2018.01); *C09D 7/65* (2018.01); *C09D 7/80* (2018.01); *C09D 147/00* (2013.01); *H01G 11/36* (2013.01); *C08K 9/02* (2013.01); *C08K 2201/001* (2013.01); *C08K 2201/011* (2013.01)

(58) Field of Classification Search
CPC ......... H01M 4/625; H01G 11/36; C09D 7/62; C09D 147/00
See application file for complete search history.

(56) References Cited

U.S. PATENT DOCUMENTS

| | | |
|---|---|---|
| 9,583,278 B2 | 2/2017 | Miyauchi et al. |
| 2013/0316251 A1 | 11/2013 | Leblanc et al. |

FOREIGN PATENT DOCUMENTS

| | | | | |
|---|---|---|---|---|
| JP | 6743954 B1 * | 8/2020 | ............ | Y02E 60/10 |
| KR | 1020150022806 A | 3/2015 | | |
| KR | 1020160102404 A | 8/2016 | | |
| WO | 2013191080 A1 | 12/2013 | | |

OTHER PUBLICATIONS

Feb. 28, 2023, International Preliminary Report on Patentability issued in the International Patent Application No. PCT/JP2021/031416.

* cited by examiner

*Primary Examiner* — Khanh T Nguyen
(74) *Attorney, Agent, or Firm* — KENJA IP LAW PC

(57) ABSTRACT

A conductive material dispersion liquid for an electrochemical device contains a conductive material, a dispersant, and a solvent. The conductive material dispersion liquid for an electrochemical device has a zeta potential absolute value within a range of 30 mV or less, the dispersant is a polymer including a nitrile group-containing monomer unit and an alkylene structural unit, and the solvent is an organic solvent.

9 Claims, No Drawings

CONDUCTIVE MATERIAL DISPERSION LIQUID FOR ELECTROCHEMICAL DEVICE, SLURRY COMPOSITION FOR ELECTROCHEMICAL DEVICE ELECTRODE AND METHOD OF PRODUCING SAME, ELECTRODE FOR ELECTROCHEMICAL DEVICE, AND ELECTROCHEMICAL DEVICE

TECHNICAL FIELD

The present disclosure relates to a conductive material dispersion liquid for an electrochemical device, a slurry composition for an electrochemical device electrode and method of producing the same, an electrode for an electrochemical device, and an electrochemical device.

BACKGROUND

Electrochemical devices such as lithium ion secondary batteries have characteristics such as compact size, light weight, high energy density, and the ability to be repeatedly charged and discharged, and are used in a wide variety of applications. Consequently, in recent years, studies have been made to improve battery members such as electrodes with the aim of achieving even higher electrochemical device performance.

An electrode used in an electrochemical device such as a lithium ion secondary battery generally includes a current collector and an electrode mixed material layer formed on the current collector. The electrode mixed material layer is formed, for example, through application and drying on the current collector of a slurry composition that contains an electrode active material, a carbon material (conductive carbon) as a conductive material, and at least one type of polymer serving as a binder or dispersant dispersed in a solvent.

In recent years, attempts have been made to improve binder compositions used in the formation of electrode mixed material layers with the aim of achieving further improvement of electrochemical device performance. For example, Patent Literature (PTL) 1 discloses a binder composition for an electrical storage device electrode containing polymer particles that include repeating units derived from an unsaturated carboxylic acid in a proportion of 5 mass % to 40 mass % of the overall polymer particles, that have a surface acid content of more than 1 mmol/g and not more than 6 mmol/g, and that may also have a zeta potential of −80 mV to −10 mV. PTL 1 discloses that through the zeta potential of the polymer particles being within the aforementioned range, it is possible to produce a slurry for an electrical storage device electrode having greater stability and homogeneity, thereby enabling increased uniformity of an obtained active material layer and suppression of variation of charge/discharge characteristics in an electrode.

CITATION LIST

Patent Literature

PTL 1: WO2013/191080A1

SUMMARY

Technical Problem

In recent years, there has been demand for further enhancing rate characteristics and high-temperature storage characteristics of electrochemical devices such as secondary batteries. There has also been demand for a conductive material dispersion liquid for an electrochemical device that is used in production of an electrochemical device to have excellent dispersion state stability over time. However, there is room for further improvement of the dispersion state stability over time of a conventional conductive material dispersion liquid. There is also room for further improvement of rate characteristics and high-temperature storage characteristics in an electrochemical device such as a secondary battery that is produced using a conventional slurry composition.

Accordingly, one object of the present disclosure is to provide a conductive material dispersion liquid for an electrochemical device that has excellent dispersion state stability over time and that can enhance rate characteristics and high-temperature storage characteristics of an obtained electrochemical device.

Another object of the present disclosure is to provide a slurry composition for an electrochemical device electrode, and method of producing the same, that can enhance rate characteristics and high-temperature storage characteristics of an obtained electrochemical device.

Yet another object of the present disclosure is to provide an electrode for an electrochemical device that can sufficiently improve rate characteristics and high-temperature storage characteristics of an electrochemical device and an electrochemical device that has excellent rate characteristics, high-temperature storage characteristics, and so forth.

Solution to Problem

The inventors conducted diligent investigation with the aim of solving the problems set forth above. The inventors made a new finding that with respect to a conductive material dispersion liquid for an electrochemical device in which a dispersant formed of a polymer that includes a nitrile group-containing monomer unit and an alkylene structural unit is dispersed in an organic solvent, setting an absolute value of the zeta potential of the conductive material dispersion liquid for an electrochemical device as 30 mV or less results in a conductive material dispersion liquid for an electrochemical device that has excellent dispersion state stability over time and that can enhance rate characteristics and high-temperature storage characteristics of an obtained electrochemical device. In this manner, the inventors completed the present disclosure.

Specifically, the present disclosure aims to advantageously solve the problems set forth above, and a presently disclosed conductive material dispersion liquid for an electrochemical device comprises a conductive material, a dispersant, and a solvent, wherein the conductive material dispersion liquid for an electrochemical device has a zeta potential absolute value within a range of 30 mV or less, the dispersant is a polymer including a nitrile group-containing monomer unit and an alkylene structural unit, and the solvent is an organic solvent. In the case of a conductive material dispersion liquid for an electrochemical device that has a dispersant formed of a polymer including a nitrile group-containing monomer unit and an alkylene structural unit dispersed in an organic solvent and that has a zeta potential absolute value of 30 mV or less in this manner, the conductive material dispersion liquid for an electrochemical device has excellent dispersion state stability over time and can enhance rate characteristics and high-temperature storage characteristics of an obtained electrochemical device.

Note that it is possible to judge whether a given polymer includes a specific monomer unit or a specific structural unit through a nuclear magnetic resonance (NMR) method such as $^1$H-NMR. Also note that when a given polymer is said to "include a monomer unit", this means that "a polymer obtained using that monomer includes a repeating unit derived from the monomer".

Moreover, the zeta potential of a conductive material dispersion liquid for an electrochemical device can be measured in accordance with a method described in the EXAMPLES section of the present specification.

In the presently disclosed conductive material dispersion liquid for an electrochemical device, an adsorbed amount (X) of the dispersant to the conductive material calculated by formula (1), shown below, preferably satisfies a relationship: 0.4≤adsorbed amount (X)≤1.

$$\text{Adsorbed amount } (X) \text{ [mg/m}^2\text{]=Mass } (A) \text{ of dispersant adsorbed to conductive material [mg]/Total mass } (B) \text{ of conductive material [mg]} \times 1000/\text{Specific surface area } (S) \text{ of conductive material [m}^2\text{/g]} \quad (1)$$

A conductive material dispersion liquid for an electrochemical device for which the value of the adsorbed amount (X) satisfies the relationship set forth above has even better dispersion state stability over time and can further enhance rate characteristics and high-temperature storage characteristics of an obtained electrochemical device.

Note that the "Mass (A) of dispersant adsorbed to conductive material", "Total mass (B) of conductive material", and "Specific surface area (S) of conductive material" that are parameters used to calculate the adsorbed amount (X) can be measured in accordance with methods described in the EXAMPLES section of the present specification.

In the presently disclosed conductive material dispersion liquid for an electrochemical device, proportional content of the nitrile group-containing monomer unit in the polymer is preferably not less than 10 mass % and not more than 60 mass %. When the proportional content of the nitrile group-containing monomer unit in the polymer is within the range set forth above, stability over time of the conductive material dispersion liquid and rate characteristics and high-temperature storage characteristics of an obtained electrochemical device can be further enhanced. Note that the proportional content of a given monomer unit or the like in a polymer can be judged by a nuclear magnetic resonance (NMR) method such as $^1$H-NMR.

In the presently disclosed conductive material dispersion liquid for an electrochemical device, the polymer is preferably a polymer for which, upon measurement by dynamic light scattering, a value (A) detected for volume-average particle diameter D50 is not less than 50 nm and not more than 800 nm, and one or more peaks are detected in a particle diameter range of not less than 5 μm and not more than 30 μm. When the polymer is a polymer that can satisfy the specific conditions set forth above, stability over time of the conductive material dispersion liquid and rate characteristics and high-temperature storage characteristics of an obtained electrochemical device can be further enhanced.

Note that measurement of the polymer by dynamic light scattering can be performed according to a method described in the EXAMPLES section.

In the presently disclosed conductive material dispersion liquid for an electrochemical device, the conductive material preferably includes one or more carbon nanotubes having a surface base content of not less than 0.01 mmol/g and not more than 0.10 mmol/g and having a ratio of surface acid content relative to the surface base content of not less than 0.1 and not more than 1.0. Stability over time of this conductive material dispersion liquid can be further increased, and rate characteristics of an obtained secondary battery can be further enhanced.

Note that the "surface base content" and "surface acid content" of carbon nanotubes can be measured by methods described in the EXAMPLES section of the present specification.

The presently disclosed conductive material dispersion liquid for an electrochemical device preferably further comprises not less than 0.01 mass % and not more than 0.2 mass % of a substituted phenol compound based on total mass of the polymer. A conductive material dispersion liquid for an electrochemical device that contains a substituted phenol compound in the range set forth above has even better stability over time and can further enhance rate characteristics and high-temperature storage characteristics of an obtained electrochemical device.

Moreover, the present disclosure aims to advantageously solve the problems set forth above, and a presently disclosed slurry composition for an electrochemical device comprises: an electrode active material; and any one of the conductive material dispersion liquids for an electrochemical device set forth above. Through a slurry composition for an electrochemical device that contains the conductive material dispersion liquid for an electrochemical device set forth above and an electrode active material in this manner, it is possible to obtain an electrochemical device having excellent rate characteristics and high-temperature storage characteristics.

Furthermore, the present disclosure aims to advantageously solve the problems set forth above, and a presently disclosed method of producing a slurry composition for an electrochemical device electrode comprises: a first step of mixing the polymer, the conductive material, and the solvent to produce a conductive material dispersion liquid; and a second step of mixing the conductive material dispersion liquid obtained in the first step and the electrode active material. The presently disclosed production method set forth above enables efficient production of the presently disclosed slurry composition for an electrochemical device electrode set forth above.

Also, the present disclosure aims to advantageously solve the problems set forth above, and a presently disclosed electrode for an electrochemical device comprises an electrode mixed material layer formed using the slurry composition for an electrochemical device electrode set forth above. Using the slurry composition for an electrochemical device electrode set forth above in this manner enables good formation of an electrode for an electrochemical device that can sufficiently improve rate characteristics and high-temperature storage characteristics of an electrochemical device.

Moreover, the present disclosure aims to advantageously solve the problems set forth above, and a presently disclosed electrochemical device comprises the electrode for an electrochemical device set forth above. By using the electrode for an electrochemical device set forth above in this manner, it is possible to sufficiently improve battery characteristics such as rate characteristics and high-temperature storage characteristics.

Advantageous Effect

According to the present disclosure, it is possible to provide a conductive material dispersion liquid for an electrochemical device that has excellent dispersion state stability over time and that can enhance rate characteristics and high-temperature storage characteristics of an obtained electrochemical device.

Moreover, according to the present disclosure, it is possible to provide a slurry composition for an electrochemical device electrode, and method of producing the same, that can enhance rate characteristics and high-temperature storage characteristics of an obtained electrochemical device.

Furthermore, according to the present disclosure, it is possible to provide an electrode for an electrochemical device that can sufficiently improve rate characteristics and high-temperature storage characteristics of an electrochemical device and an electrochemical device that has excellent rate characteristics, high-temperature storage characteristics, and so forth.

DETAILED DESCRIPTION

The following provides a detailed description of embodiments of the present disclosure.

The presently disclosed conductive material dispersion liquid for an electrochemical device can be used in production of a slurry composition for an electrochemical device electrode. Moreover, the presently disclosed slurry composition for an electrochemical device electrode can be used in formation of an electrode of an electrochemical device. Furthermore, the presently disclosed slurry composition for an electrochemical device electrode can be efficiently produced according to the presently disclosed method of producing a slurry composition for an electrochemical device electrode. A feature of the presently disclosed electrochemical device is that an electrode for an electrochemical device formed using the presently disclosed slurry composition for an electrochemical device electrode is used therein.

Note that the presently disclosed dispersion liquid for an electrochemical device and slurry composition for an electrochemical device can, in particular, suitably be used in formation of a positive electrode of an electrochemical device.

(Conductive Material Dispersion Liquid for Electrochemical Device)

The presently disclosed conductive material dispersion liquid for an electrochemical device is a conductive material dispersion liquid for an electrochemical device that contains a conductive material, a polymer including a nitrile group-containing monomer unit and an alkylene structural unit as a dispersant, and an organic solvent, and a feature thereof is that an absolute value of the zeta potential thereof is within a range of 30 mV or less. The presently disclosed conductive material dispersion liquid for an electrochemical device can optionally further contain other components in addition to the polymer that satisfies the specific chemical composition and attributes set forth above. The presently disclosed conductive material dispersion liquid for an electrochemical device may also unavoidably contain water.

As a result of the presently disclosed conductive material dispersion liquid for an electrochemical device (hereinafter, also referred to simply as a "conductive material dispersion liquid") containing the polymer satisfying the specific chemical composition set forth above as a dispersant and having a zeta potential absolute value that is within a range of 30 mV or less, the presently disclosed conductive material dispersion liquid for an electrochemical device has excellent dispersion state stability over time and can enhance rate characteristics and high-temperature storage characteristics of an obtained electrochemical device. Although the reason for this is not clear, it is presumed to be as follows. Firstly, the specific polymer serving as a dispersant that is contained in the conductive material dispersion liquid is thought to be present in a state adsorbed to the surface of the conductive material in an organic solvent that is ordinarily used in production of an electrochemical device. As a result of the polymer covering the surface of the conductive material, the surface charge of the conductive material is reduced. Note that the value of the zeta potential of a given solution tends to decrease with decreasing polarization in the solution and charge of components contained in the solution. Therefore, it is thought that the absolute value of the zeta potential of the conductive material dispersion liquid can be reduced by reducing the surface charge of the conductive material. Through further investigation, the inventors reached a new finding that restricting the absolute value of the zeta potential of the conductive material dispersion liquid to within a range of 30 mV or less enables good control of the state of coverage of the conductive material by the polymer. The conductive material that is suitably covered by the polymer is thought to be dispersed stably over time in the conductive material dispersion liquid. It is also thought that by using this conductive material dispersion liquid, it is possible to maintain ion conductivity well in an obtained electrode while also enhancing rate characteristics and high-temperature storage characteristics of an obtained secondary battery because sites at the surface of the conductive material that can act as a starting point for side reactions are protected by the polymer in the obtained electrode.

<Absolute Value of Zeta Potential of Conductive Material Dispersion Liquid>

The absolute value of the zeta potential of the conductive material dispersion liquid is required to be 30 mV or less. Moreover, the absolute value of the zeta potential is more preferably 20 mV or less, even more preferably 12 mV or less, and particularly preferably 10 mV or less. When the absolute value of the zeta potential is within any of the ranges set forth above, the conductive material dispersion liquid has excellent dispersion state stability over time and can enhance rate characteristics and high-temperature storage characteristics of an obtained electrochemical device. Note that although no specific limitations are placed on a lower limit for the absolute value of the zeta potential, the absolute value of the zeta potential can be 0.1 mV or more, for example.

<Adsorbed Amount (X) of Dispersant to Conductive Material>

In the presently disclosed conductive material dispersion liquid, an adsorbed amount (X) [mg/m$^2$] of the dispersant to the conductive material calculated by the following formula (1) preferably satisfies a relationship: 0.4≤adsorbed amount (X)≤1.

Adsorbed amount (X) [mg/m$^2$]=Mass (A) of dispersant adsorbed to conductive material [mg]/Total mass (B) of conductive material [mg]×1000/ Specific surface area (S) of conductive material [m$^2$/g]    (1)

Moreover, the adsorbed amount (X) [mg/m$^2$] is preferably 0.5 [mg/m$^2$] or more, more preferably 0.6 [mg/m$^2$] or more, and even more preferably 0.8 [mg/m$^2$] or more. When the adsorbed amount (X) is not less than any of the lower limits set forth above, this means that the surface of the conductive material is sufficiently covered by the dispersant, and thus the conductive material dispersion liquid has excellent dispersion state stability over time and can enhance rate characteristics and high-temperature storage characteristics of an obtained electrochemical device.

<Viscosity of Conductive Material Dispersion Liquid>

The viscosity of the conductive material dispersion liquid is preferably 16 Pa·s or less, and more preferably 4 Pa·s or less, and is preferably 0.05 Pa·s or more, and more preferably 0.2 Pa·s or more. When the value of the viscosity of the conductive material dispersion liquid is within any of the ranges set forth above, this means that the conductive material is dispersed well in the conductive material dispersion liquid. Note that the viscosity of a conductive material dispersion liquid can be measured by a method described in the EXAMPLES section.

<Polymer>

The polymer is a component that can function as a dispersant that disperses the conductive material and the like in a slurry composition when the conductive material dispersion liquid is used to produce a slurry composition and that, in an electrode mixed material layer formed using this slurry composition, can hold components contained in the electrode mixed material layer so that the components do not detach from the electrode mixed material layer (i.e., can function as a binder).

<<Chemical Composition of Polymer>>

The polymer is required to include a nitrile group-containing monomer unit and an alkylene structural unit.

Examples of monomers that can be used to form a nitrile group-containing monomer unit include α,β-ethylenically unsaturated nitrile monomers. Specifically, examples of α,β-ethylenically unsaturated nitrile monomers that may be used include acrylonitrile; α-halogenoacrylonitriles such as α-chloroacrylonitrile and α-bromoacrylonitrile; and α-alkylacrylonitriles such as methacrylonitrile and α-ethylacrylonitrile. One of these α,β-ethylenically unsaturated nitrile monomers may be used individually, or two or more of these α,β-ethylenically unsaturated nitrile monomers may be used in combination. Of these α,β-ethylenically unsaturated nitrile monomers, acrylonitrile and methacrylonitrile are preferable from a viewpoint of increasing binding strength that can be displayed by the polymer, and acrylonitrile is more preferable. The proportional content of nitrile group-containing monomer units in the polymer when all repeating units are taken to be 100 mass % is preferably 10 mass % or more, and more preferably 15 mass % or more, and is preferably 60 mass % or less, more preferably 55 mass % or less, and even more preferably 50 mass % or less. When the proportional content of nitrile group-containing monomer units in the polymer is not less than any of the lower limits set forth above, dispersion state stability over time of the conductive material dispersion liquid can be further increased, and high-temperature storage characteristics of an obtained electrochemical device can be further enhanced. When the proportional content of nitrile group-containing monomer units in the polymer is not more than any of the upper limits set forth above, dispersion state stability over time of the conductive material dispersion liquid can be further increased while also inhibiting excessive increase of swellability in electrolyte solution and deterioration of rate characteristics of an electrochemical device.

An alkylene structural unit included in the polymer is a repeating unit that is composed of only an alkylene structure represented by a general formula: $-C_nH_{2n}-$ (n is an integer of 2 or more). Although the alkylene structural unit may be linear or branched, the alkylene structural unit is preferably linear (i.e., is preferably a linear alkylene structural unit). Moreover, the carbon number of the alkylene structural unit is preferably 4 or more (i.e., n in the preceding general formula is preferably an integer of 4 or more).

No specific limitations are placed on the method by which the alkylene structural unit is introduced into the polymer. For example, method (1) or (2) described below may be used.

(1) A method in which a polymer is produced from a monomer composition containing a conjugated diene monomer and then the polymer is hydrogenated in order to convert a conjugated diene monomer unit to an alkylene structural unit (2) A method in which a polymer is produced from a monomer composition containing a 1-olefin monomer Of these methods, method (1) is preferable in terms of ease of production of the polymer.

The conjugated diene monomer may be a conjugated diene compound having a carbon number of 4 or more such as 1,3-butadiene, isoprene, 2,3-dimethyl-1,3-butadiene, 2-ethyl-1,3-butadiene, or 1,3-pentadiene, for example. Of these conjugated diene compounds, 1,3-butadiene is preferable. In other words, the alkylene structural unit is preferably a structural unit obtained through hydrogenation of a conjugated diene monomer unit (i.e., the alkylene structural unit is preferably a hydrogenated conjugated diene unit), and is more preferably a structural unit obtained through hydrogenation of a 1,3-butadiene unit (i.e., the alkylene structural unit is more preferably a hydrogenated 1,3-butadiene unit).

The 1-olefin monomer may be ethylene, propylene, 1-butene, 1-hexene, or the like, for example.

One of these conjugated diene monomers or 1-olefin monomers may be used individually, or two or more of these conjugated diene monomers or 1-olefin monomers may be used in combination.

Selective hydrogenation of a conjugated diene monomer unit can be carried out by a commonly known method such as an oil-layer hydrogenation method or a water-layer hydrogenation method. Of these methods, it is preferable that hydrogenation is performed by oil-layer hydrogenation. Hydrogenation by oil-layer hydrogenation is described further below.

The proportional content of alkylene structural units in the polymer when all repeating units are taken to be 100 mass % is preferably 40 mass % or more, more preferably 45 mass % or more, and even more preferably 50 mass % or more, and is preferably 90 mass % or less, and more preferably 85 mass % or less. When the proportional content of alkylene structural units in the polymer is not less than any of the lower limits set forth above, dispersion state stability over time of the conductive material dispersion liquid can be further increased while also inhibiting excessive increase of swellability in electrolyte solution and deterioration of rate characteristics of an electrochemical device. When the proportional content of alkylene structural units in the polymer is not more than any of the upper limits set forth above, dispersion state stability over time of the conductive material dispersion liquid can be further increased, and high-temperature storage characteristics of an obtained electrochemical device can be further enhanced. Note that in a case in which the polymer is a polymer that is obtained according to method (1) described above, the total proportion constituted by alkylene structural units and conjugated diene monomer units in the polymer preferably satisfies any of the ranges set forth above.

Note that besides a nitrile group-containing monomer unit and an alkylene structural unit such as described above, the polymer may include other monomer units that are copolymerizable therewith. Examples of such monomer units include, but are not specifically limited to, a (meth)acrylic acid ester monomer unit, an aromatic vinyl monomer unit, and an acidic group-containing monomer unit. Note that in the present specification, "(meth)acryl" is used to indicate "acryl" or "methacryl". In a case in which the polymer includes repeating units other than nitrile group-containing monomer units and alkylene structural units, the upper limit for the content thereof is preferably 50 mass % or less, more preferably 40 mass % or less, and even more preferably 35 mass % or less when all repeating units are taken to be 100 mass %.

[(Meth)Acrylic Acid Ester Monomer Unit]

Examples of (meth)acrylic acid ester monomers that can form a (meth)acrylic acid ester monomer unit include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, and 2-ethylhexyl acrylate; and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, and 2-ethylhexyl methacrylate. One of these (meth)acrylic acid ester monomers may be used individually, or two or more of these (meth)acrylic acid ester monomers may be used in combination.

[Aromatic Vinyl Monomer Unit]

Examples of aromatic vinyl monomers that can form an aromatic vinyl monomer unit include styrene, α-methylstyrene, vinyltoluene, and divinylbenzene. One of these aromatic vinyl monomers may be used individually, or two or more of these aromatic vinyl monomers may be used in combination.

[Acidic Group-Containing Monomer Unit]

Examples of acidic group-containing monomers that can form an acidic group-containing monomer unit include carboxy group-containing monomers, sulfo group-containing monomers, and phosphate group-containing monomers. One of these acidic group-containing monomers may be used individually, or two or more of these acidic group-containing monomers may be used in combination. Note that examples of carboxy group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Furthermore, an acid anhydride that produces a carboxy group through hydrolysis can also be used as a carboxy group-containing monomer.

One of these carboxy group-containing monomers may be used individually, or two or more of these carboxy group-containing monomers may be used in combination.

<<Production Method of Polymer>>

No specific limitations are placed on the method by which the polymer is produced. The polymerization method used in production of the polymer is not specifically limited and may be solution polymerization, suspension polymerization, bulk polymerization, emulsion polymerization, or the like. Of these methods, emulsion polymerization is preferable. Moreover, ionic polymerization, radical polymerization, living radical polymerization, or the like may be adopted as the polymerization reaction. Furthermore, typically used emulsifiers, dispersants, polymerization initiators, molecular weight modifiers, and the like can be used in the polymerization, and the amount thereof can also be the same as typically used. In particular, it is preferable to use tert-dodecyl mercaptan as a molecular weight modifier. The additive amount of the molecular weight modifier is preferably not less than 0.1 parts by mass and not more than 2.0 parts by mass based on 100 parts by mass of monomers in a monomer composition used in the polymerization reaction. The polymerization temperature is preferably not lower than 0° C. and not higher than 50° C.

The polymerization conversion rate when the polymerization reaction is terminated is preferably more than 90%, and more preferably 92% or more, and is preferably 97% or less. Through the polymerization conversion rate being not less than any of the lower limits set forth above, formation of clusters can be facilitated, and the polymer contained in the presently disclosed conductive material dispersion liquid can be efficiently produced.

A specific substituted phenol compound is preferably added to a dispersion liquid containing a polymerized product that is obtained through the polymerization reaction. This substituted phenol compound may be any substituted phenol compound that includes at least one phenolic hydroxy group and at least one alkyl group, but is preferably a substituted phenol compound that includes one or two phenolic hydroxy groups and that also includes at least one alkyl group at an ortho position, meta position, or para position of a phenolic hydroxy group. Moreover, a substituted phenol compound that includes a group other than an alkyl group at an ortho position, meta position, or para position of a phenolic hydroxy group may be used. Examples of such substituted phenol compounds include, but are not specifically limited to, various substituted phenol compounds represented by the following general formulae (1) and (2).

[Chem. 1]

(1)

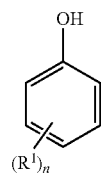

(2)

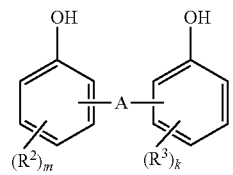

In general formula (1), each $R^1$ is independently an alkyl group having a carbon number of 1 to 7, an alkoxy group having a carbon number of 1 to 5, an amino group, an amino group substituted with an alkyl group having a carbon number of 1 to 4, or a nitrogen-containing heterocyclic group, and n is an integer of 1 to 5. Moreover, at least one $R^1$ in general formula (1) is an alkyl group having a carbon number of 1 to 7.

In general formula (2), each $R^2$ or $R^3$ is independently an alkyl group having a carbon number of 1 to 7, an alkoxy group having a carbon number of 1 to 5, an amino group, an amino group substituted with an alkyl group having a carbon number of 1 to 4, or a nitrogen-containing heterocyclic group, A is a chemical single bond or an alkylene group having a carbon number of 1 to 4, and m and k are each independently an integer of 1 to 4. Moreover, at least one $R^2$ in general formula (2) is an alkyl group having a carbon number of 1 to 7, and at least one $R^3$ in general formula (2) is an alkyl group having a carbon number of 1 to 7.

Of compounds represented by general formula (1), compounds including an alkyl group having a carbon number of 1 to 5 as $R^1$ at at least an ortho position or a para position of the phenolic hydroxy group are preferable, and compounds including an alkyl group having a carbon number of 1 to 5 at every one of the two ortho positions and the para position of the phenolic hydroxy group are particularly preferable in terms that the effects disclosed herein can be made more evident.

Likewise, of compounds represented by general formula (2), compounds represented by the following general formula (3) are preferable in terms that the effects disclosed herein can be made more evident. Moreover, of compounds represented by general formula (3), compounds including an alkyl group having a carbon number of 1 to 5 as $R^2$ and $R^3$ at at least an ortho position or a para position in the two phenolic hydroxy groups of the two aromatic rings are preferable, and compounds including an alkyl group having a carbon number of 1 to 5 at every ortho position and para position in the two phenolic hydroxy groups of the two aromatic rings are particularly preferable.

[Chem. 2]

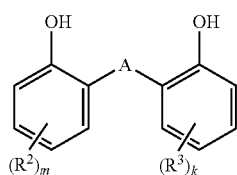

(3)

($R^2$, $R^3$, A, m, and k in general formula (3) are the same as in general formula (2).)

Specific examples of the substituted phenol compound include 2-isopropyl-5-methylphenol, 3-methyl-4-isopropylphenol, butylhydroxyanisole, 2-(2H-benzotriazol-2-yl)-4,6-di-tert-butylphenol, 2,6-di-tert-butyl-p-cresol, 2,6-di-tert-butyl-α-dimethylamino-p-cresol, a mixture of 2,6-di-tert-butylphenol, 2,4,6-tri-tert-butylphenol, and ortho-tert-butylphenol, mono(α-methylbenzyl)phenol, di(α-methylbenzyl)phenol, tri(α-methylbenzyl)phenol, a mixture of alkyl and aralkyl-substituted phenols, 2,2'-methylenebis(4-methyl-6-tert-butylphenol), 2,2'-methylenebis(4-methyl-6-cyclohexylphenol), 2,2'-methylenebis(4-ethyl-6-tert-butylphenol), alkylated bisphenol, 4,4'-methylenebis(2,6-di-tert-butylphenol), methylene bridged polyhydric alkylphenol, butylated p-cresol and dicyclopentadiene, polybutylated bisphenol A, 4,4'-thiobis(6-tert-butyl-3-methylphenol), 4,4'-butylidenebis(3-methyl-6-tert-butylphenol), 2,4-bis[(octylthio)methyl]-o-cresol, a hindered phenol, and a hindered bisphenol. Of these substituted phenol compounds, 2,6-di-tert-butyl-4-methylphenol (dibutylhydroxytoluene) and 2,2'-methylenebis(4-methyl-6-tert-butylphenol) are more preferable in terms that the effects disclosed herein can be further increased, with dibutylhydroxytoluene being more preferable.

The additive amount of the substituted phenol compound (i.e., the proportional content of the substituted phenol compound in the conductive material dispersion liquid) is preferably 0.01 mass % or more, and more preferably 0.05 mass % or more based on the total mass of the polymer, and is preferably 0.2 mass % or less, and more preferably 0.15 mass % or less based on the total mass of the polymer. When the proportional content of the substituted phenol compound in the conductive material dispersion liquid is within any of the ranges set forth above, dispersion state stability over time of the conductive material dispersion liquid and rate characteristics and high-temperature storage characteristics of an obtained electrochemical device can be further enhanced. More specifically, when the proportional content of the substituted phenol compound is not less than any of the lower limits set forth above, excessive increase of the volume-average particle diameter D50 and the size of clusters of the polymer can be inhibited, and stability of the polymer can be increased. Moreover, when the proportional content of the substituted phenol compound is not more than any of the upper limits set forth above, the volume-average particle diameter D50 and the size of clusters of the polymer can be suitably increased, and dispersion state stability over time of the conductive material dispersion liquid and rate characteristics of an obtained secondary battery can be further enhanced. Therefore, through the proportional content of the substituted phenol compound being within any of the ranges set forth above, it is possible to cause an effect of breaking up and dispersing the conductive material to be displayed through small-particle diameter polymer while also, on the other hand, causing an effect of dispersion stabilization of the conductive material through steric hindrance to be displayed by clusters, and thus maintaining a good balance of these effects.

In a case in which a dispersion liquid that contains a polymerized product including a conjugated diene monomer unit and a nitrile group-containing monomer unit is obtained by the method set forth above, the obtained dispersion liquid is then coagulated by salting-out through addition of calcium chloride or the like, is subjected to filtration, washing, drying, and the like, and is then dissolved in an organic solvent such as acetone. The drying is preferably performed under reduced pressure, and the drying temperature is preferably 70° C. or higher, and is preferably 150° C. or lower, and more preferably 130° C. or lower. Next, the pre-hydrogenation polymer that has been dissolved in the organic solvent is subjected to a hydrogenation reaction by oil-layer hydrogenation so as to obtain a hydrogenation reaction product. A post-hydrogenation polymer can then be obtained by separating a catalyst component from the obtained hydrogenation reaction product by filtration and removing the organic solvent that was used in the hydrogenation reaction. The polymer may be used in that form or as a solution having the polymer dissolved in a subsequently described solvent.

Note that the hydrogenation reaction by oil-layer hydrogenation can be performed using a commonly known selective hydrogenation catalyst such as a palladium-based catalyst or a rhodium-based catalyst. In particular, a palladium-based catalyst can suitably be used. Two or more of such catalysts may be used in combination. These catalysts are typically used in a mounted form on a support. The support may be silica, silica-alumina, alumina, diatomite, activated carbon, or the like. The used amount of the catalyst, as an amount in terms of metal, can be preferably 10 ppm to 5,000 ppm, and more preferably 100 ppm to 3,000 ppm based on 100 parts by mass of the pre-hydrogenation polymer that is the subject of hydrogenation. The used amount of the catalyst can be altered as appropriate in order to adjust the iodine value of the obtained polymer to a desired value.

The hydrogenation reaction temperature in the oil-layer hydrogenation is preferably 0° C. or higher, more preferably 10° C. or higher, even more preferably 50° C. or higher, and particularly preferably 70° C. or higher, and is preferably 200° C. or lower, more preferably 115° C. or lower, and even more preferably 105° C. or lower. The hydrogenation pressure in the oil-layer hydrogenation is preferably 0.1 MPa to 30 MPa, and more preferably 0.2 MPa to 20 MPa. The hydrogenation reaction time in the oil-layer hydrogenation is preferably 1 hour to 50 hours, and more preferably 2 hours to 25 hours.

The value for the volume-average particle diameter D50 of individual polymer molecules and the size of clusters can be controlled through a combination of the temperature (for example, the polymerization temperature during polymerization of the specific polymer contained in the presently disclosed conductive material dispersion liquid, the drying temperature after polymerization, and the hydrogenation temperature) and the amount of the substituted phenol compound. For example, a higher temperature up until the polymer is produced, in terms of polymerization temperature, drying temperature after polymerization, hydrogenation temperature, and so forth, tends to promote formation of clusters, whereas compounding of a larger amount of the substituted phenol compound tends to suppress formation of clusters. Accordingly, the value for the volume-average particle diameter D50 of individual polymer molecules and the size of clusters can be controlled to within desired ranges through balancing of these conditions.

<<Volume-Average Particle Diameter D50 of Polymer>>

The volume-average particle diameter D50 of the polymer can be measured by dynamic light scattering measurement according to a method described in the EXAMPLES section of the present specification as previously described. The volume-average particle diameter D50 of the polymer can be not less than 50 nm and not more than 800 nm, and, at the upper limit side, is preferably 650 nm or less, and more preferably 450 nm or less. When the volume-average particle diameter D50 of the polymer is not less than the lower limit set forth above, initial dispersion of the conductive material improves, which enables better covering of the conductive material by the polymer and can further enhance high-temperature storage characteristics of an obtained electrochemical device. Moreover, when the volume-average particle diameter D50 of the polymer is not more than any of the upper limits set forth above, functionality of the polymer as a dispersant is enhanced, which can further increase dispersion state stability over time of the conductive material dispersion liquid and can further enhance rate characteristics and high-temperature storage characteristics of an obtained electrochemical device. Note that the volume-average particle diameter D50 of the polymer can be appropriately controlled through the chemical composition of the polymer, the production conditions of the polymer, and so forth. For example, the value of the volume-average particle diameter D50 can be reduced by reducing the proportional content of nitrile group-containing monomer units in the polymer, whereas the value of the volume-average particle diameter D50 can be increased by increasing the proportional content of nitrile group-containing monomer units in the polymer. The value of the volume-average particle diameter D50 can also be reduced by increasing the iodine value of the polymer (i.e., by increasing the proportion of carbon-carbon unsaturated bonds in repeating units forming the polymer). Furthermore, the value of the volume-average particle diameter D50 can be reduced by compounding a larger amount of an antioxidant in production of the polymer. Moreover, with regards to production conditions of the polymer, raising the drying temperature or hydrogenation reaction temperature of the polymer can increase the value of the volume-average particle diameter D50.

<<Peaks Detected in Particle Diameter Range of not Less than 5 µm and not More than 30 µm>>

It is preferable that upon measurement of the polymer by dynamic light scattering, one or more peaks are detected in a particle diameter range of not less than 5 µm and not more than 30 µm. Moreover, the particle diameter range in which the polymer has one or more peaks is preferably 7 µm or more, and is preferably 20 µm or less, and more preferably 17 µm or less. When the particle diameter range in which the polymer has one or more peaks is not less than any of the lower limits set forth above, rate characteristics of an obtained electrochemical device can be further enhanced. Moreover, when the particle diameter range in which the polymer has one or more peaks is not more than any of the upper limits set forth above, dispersion state stability over time of the conductive material dispersion liquid can be further increased, and rate characteristics and high-temperature storage characteristics of an obtained electrochemical device can be further enhanced. Note that the one or more peaks detected in a particle diameter range of not less than 5 µm and not more than 30 µm are thought to indicate the size of clusters formed by a plurality of polymer molecules and that the value of a particle diameter at which a peak is detected can be increased by, in the production conditions of the polymer, setting the drying temperature and the hydrogenation reaction temperature of the polymer as higher than specific temperatures, for example.

<<Value of Parameter (B/A)>>

When a value for a particle diameter corresponding to a largest peak among the one or more peaks that are detected in the particle diameter range of not less than 5 µm and not more than 30 µm upon measurement of the polymer by dynamic light scattering is taken to be (B), the value of a parameter (B/A) that is obtained by dividing the value (B) for the particle diameter by the value (A) for the volume-average particle diameter D50 is preferably 7 or more, and more preferably 25 or more, and is preferably 300 or less, and more preferably 200 or less. When the value of the parameter (B/A) is within any of the ranges set forth above, dispersion state stability over time of the conductive material dispersion liquid can be further increased, and rate characteristics of an obtained electrochemical device can be further enhanced.

<<Iodine Value of Polymer>>

The iodine value of the polymer is preferably 1 mg/100 mg or more, and more preferably 3 mg/100 mg or more, and is preferably 60 mg/100 mg or less, more preferably 50 mg/100 mg or less, and even more preferably 40 mg/100 mg or less. When the iodine value of the polymer is not less than any of the lower limits set forth above, the content of carbon-carbon double bonds in the polymer, which can act as a starting point for side reactions, is sufficiently low, and high-temperature storage characteristics of an obtained electrochemical device can be further enhanced. When the iodine value of the polymer is not more than any of the upper limits set forth above, gaps of suitable size can be formed when an electrode is formed, and rate characteristics of an obtained electrochemical device can be further enhanced. The iodine value of the polymer can be controlled by altering hydrogenation conditions in production of the polymer, for example. Note that the iodine value of the polymer can be measured by a method described in the EXAMPLES section of the present specification.

<Organic Solvent>

The organic solvent may be an alcohol such as methanol, ethanol, n-propanol, isopropanol, n-butanol, isobutanol, t-butanol, pentanol, hexanol, heptanol, octanol, nonanol, decanol, or amyl alcohol, a ketone such as acetone, methyl ethyl ketone, or cyclohexanone, an ester such as ethyl acetate or butyl acetate, an ether such as diethyl ether, dioxane, or tetrahydrofuran, an amide polar organic solvent such as N,N-dimethylformamide or N-methyl-2-pyrrolidone (NMP), an aromatic hydrocarbon such as toluene, xylene, chlorobenzene, orthodichlorobenzene, or paradichlorobenzene, or the like, for example. One of these organic solvents may be used individually, or two or more of these organic solvents may be used as a mixture. Of these examples, NMP is preferable as the organic solvent. The method by which the polymer is dissolved in the organic solvent can be a method using a known technique that is typically used such as mixing using a disper blade.

<Conductive Material>

The conductive material is a material for ensuring electrical contact among an electrode active material. Examples of conductive materials that can be used include conductive carbon materials such as carbon black (for example, acetylene black, Ketjenblack® (Ketjenblack is a registered trademark in Japan, other countries, or both), and furnace black), single-walled or multi-walled carbon nanotubes (multi-walled carbon nanotubes are inclusive of cup-stacked carbon nanotubes), carbon nanohorns, vapor-grown carbon fiber, milled carbon fiber obtained by pyrolyzing and then pulverizing polymer fiber, single-layer or multi-layer graphene, and carbon non-woven fabric sheet obtained by pyrolyzing non-woven fabric made of polymer fiber; and fibers and foils of various metals. One of these conductive materials may be used individually, or two or more of these conductive materials may be used in combination. In particular, it is preferable that the conductive material includes carbon nanotubes (hereinafter, also denoted as "CNTs"). In general, CNTs readily aggregate and tend to be difficult to disperse. However, the presently disclosed conductive material dispersion liquid enables good dispersion even in a case in which the conductive material includes CNTs.

The surface base content of CNTs serving as the conductive material is preferably 0.01 mmol/g or more, and more preferably 0.02 mmol/g or more, and is preferably 0.10 mmol/g or less. When the surface base content is not less than any of the lower limits set forth above, excessive attachment of residual acid components to the surfaces of the CNTs can be inhibited. Consequently, it is possible to suppress a rise of internal resistance of an electrochemical device due to side reactions inside the electrochemical device that can be caused by residual acid components and to further enhance rate characteristics of the electrochemical device. On the other hand, when the surface base content is not more than the upper limit set forth above, aggregation of the CNTs is inhibited through sufficient coverage of the CNTs by the dispersant, which thereby enables further enhancement of high-temperature storage characteristics of an electrochemical device.

A ratio of surface acid content relative to surface base content for CNTs serving as the conductive material is preferably 0.1 or more, and more preferably 0.2 or more, and is preferably 1.0 or less, more preferably 0.8 or less, and even more preferably 0.6 or less. When the ratio of the surface acid content relative to the surface base content is not less than any of the lower limits set forth above, high-temperature storage characteristics of an electrochemical device formed using the conductive material dispersion liquid can be further enhanced. Moreover, when the ratio of the surface acid content relative to the surface base content is not more than any of the upper limits set forth above, it is possible to suppress a rise of internal resistance of an electrochemical device due to side reactions inside the electrochemical device that can be caused by residual acid components and to further enhance rate characteristics of the obtained electrochemical device. Furthermore, when the ratio of the surface acid content relative to the surface base content is within any of the ranges set forth above, dispersion state stability over time of the conductive material dispersion liquid can be further increased due to better dispersion of the CNTs in the organic solvent.

Note that the surface base content and the surface acid content of the CNTs (and in accompaniment thereto, the ratio of the surface acid content relative to the surface base content) can be controlled to desired values by altering various conditions subsequently described in the "Production of conductive material dispersion liquid" section.

The BET specific surface area of CNTs serving as the conductive material is preferably 100 $m^2/g$ or more, more preferably 150 $m^2/g$ or more, even more preferably 200 $m^2/g$ or more, and particularly preferably 250 $m^2/g$ or more, and is preferably 1,200 $m^2/g$ or less, more preferably 1,000 $m^2/g$ or less, and even more preferably 500 $m^2/g$ or less. Note that the "BET specific surface area" of the CNTs refers to the nitrogen adsorption specific surface area measured by the BET method and can be measured by a method described in the EXAMPLES section. Moreover, in a case in which CNTs that have been surface treated are compounded in the conductive material dispersion liquid, the BET specific surface area of these surface-treated CNTs preferably satisfies any of the preferred ranges set forth above.

<Ratio of Polymer and Conductive Material in Conductive Material Dispersion Liquid>

With regards to the content ratio of the conductive material and the previously described polymer in the conductive material dispersion liquid, the polymer is preferably 5 parts by mass or more, and more preferably 10 parts by mass or more when the content of the conductive material is taken to be 100 parts by mass, and is preferably 100 parts by mass or less, and more preferably 50 parts by mass or less when the content of the conductive material is taken to be 100 parts by mass.

<Other Components>

No specific limitations are placed on solvents and other components that can be compounded in the conductive material dispersion liquid, and components such as reinforcing materials, leveling agents, viscosity modifiers, and additives for electrolyte solution may be included. These other components are not specifically limited so long as they do not affect battery reactions and may be selected from commonly known components such as those described in WO2012/115096A1. One of these components may be used individually, or two or more of these components may be used in combination in a freely selected ratio.

<Production of Conductive Material Dispersion Liquid>

In a case in which the presently disclosed conductive material dispersion liquid contains surface-treated CNTs serving as the conductive material, for example, the presently disclosed conductive material dispersion liquid can be produced according to a production method that includes a step of acid treating feedstock CNTs (acid treatment step), a step of base treating the feedstock CNTs that have been acid treated (base treatment step), a step of washing the feedstock CNTs that have been base treated to obtain CNTs (surface-treated CNTs) having specific properties (washing step), and a step of mixing the conductive material including these surface-treated CNTs with the polymer and the organic solvent (mixing step).

<Acid Treatment Step>

In the acid treatment step, feedstock CNTs are subjected to acid treatment. The feedstock CNTs can be selected as appropriate from known CNTs in accordance with the desired surface-treated CNT properties (number of walls, specific surface area, etc.) without any specific limitations.

Although no specific limitations are placed on the method of acid treatment so long as an acid can be brought into contact with the feedstock CNTs, a method in which the feedstock CNTs are immersed in an acid treatment solution (aqueous solution of an acid) is preferable.

The acid that is contained in the acid treatment solution may be nitric acid, sulfuric acid, or hydrochloric acid, for example, without any specific limitations. One of these acids may be used individually, or two or more of these acids may be used in combination. Of these acids, nitric acid and sulfuric acid are preferable.

The time for which the feedstock CNTs are immersed in the acid treatment solution (immersion time) is preferably 1 minute or more, more preferably 10 minutes or more, even more preferably 30 minutes or more, and particularly preferably 50 minutes or more, and is preferably 120 minutes or less, more preferably 100 minutes or less, and even more preferably 80 minutes or less. The surface acid content of the surface-treated CNTs can be increased when the immersion time is 1 minute or more, whereas the surface acid content of the surface-treated CNTs does not excessively increase and paste production efficiency is sufficiently ensured when the immersion time is 120 minutes or less.

The temperature when the feedstock CNTs are immersed in the acid treatment solution (immersion temperature) is preferably 20° C. or higher, and more preferably 40° C. or higher, and is preferably 80° C. or lower, and more preferably 70° C. or lower. When the immersion temperature is within any of the ranges set forth above, the surface acid content of the obtained surface-treated CNTs can be increased to a suitable degree.

After this immersion, CNTs that have undergone the acid treatment step (acid-treated CNTs) can be collected from a mixture of the acid-treated CNTs and the acid treatment solution by a known technique such as filtration. The acid-treated CNTs that are collected may then be washed with water as necessary.

<Base Treatment Step>

In the base treatment step, the acid-treated CNTs that have been obtained through the acid treatment step described above are subjected to base treatment.

Although no specific limitations are placed on the method of base treatment so long as a base can be brought into contact with the acid-treated CNTs, a method in which the acid-treated CNTs are immersed in a base treatment solution (aqueous solution of a base) is preferable.

The base contained in the base treatment solution may be lithium hydroxide, ammonium chloride, sodium bicarbonate, or sodium hydroxide, for example, without any specific limitations. One of these bases may be used individually, or two or more of these bases may be used in combination. Of these bases, lithium hydroxide and ammonium chloride are preferable, and lithium hydroxide is more preferable.

The time for which the acid-treated CNTs are immersed in the base treatment solution (immersion time) is preferably 10 minutes or more, more preferably 60 minutes or more, even more preferably 80 minutes or more, and particularly preferably 90 minutes or more, and is preferably 240 minutes or less, more preferably 200 minutes or less, and even more preferably 150 minutes or less. The surface base content of the surface-treated CNTs can be increased when the immersion time is 10 minutes or more, whereas the surface base content of the surface-treated CNTs does not excessively increase and paste production efficiency is sufficiently ensured when the immersion time is 240 minutes or less.

The temperature when the acid-treated CNTs are immersed in the base treatment solution (immersion temperature) is preferably 10° C. or higher, and more preferably 20° C. or higher, and is preferably 40° C. or lower, and more preferably 27° C. or lower. When the immersion temperature is within any of the ranges set forth above, the surface base content of the obtained surface-treated CNTs can be increased to a suitable degree.

<Washing Step>

In the washing step, feedstock CNTs that have been obtained through the acid treatment step and base treatment step described above (i.e., acid/base-treated CNTs) are washed. This washing can remove excess acid components and base components (particularly base components) attached to the surfaces of the acid/base-treated CNTs and makes it possible to obtain surface-treated CNTs having specific properties.

Although no specific limitations are placed on the method by which the acid/base-treated CNTs are washed, water washing is preferable. For example, the acid/base-treated CNTs may be collected from a mixture of the acid/base-treated CNTs and the base treatment solution by a known technique such as filtration and these acid/base-treated CNTs may be washed with water. In this washing, it is possible to estimate to what extent acid components and base components have been removed by measuring the electrical conductivity of water (washing water) that has been used to wash the acid/base-treated CNTs.

After the washing step described above, removal of surface-attached water by drying and the like may be performed as necessary to obtain the surface-treated CNTs.

Note that the surface acid content and the surface base content of the surface-treated CNTs can be adjusted by altering conditions of the acid treatment step, base treatment step, and washing step described above. For example, the surface acid content and the surface base content of the surface-treated CNTs can be adjusted by altering the types and concentrations of the acid and the base that are respectively contained in the acid treatment solution and the base treatment solution used in the acid treatment step and the base treatment step. Moreover, the surface acid content of the surface-treated CNTs can be increased by increasing the immersion time in the acid treatment step, whereas the surface base content of the surface-treated CNTs can be increased by increasing the immersion time in the base treatment step. Furthermore, the surface acid content and the surface base content (particularly the surface base content) can be adjusted by altering the extent to which washing is performed in the washing step.

<Mixing Step>

In the mixing step, surface-treated CNTs that have been obtained as described above and/or another conductive material are mixed with the previously described polymer serving as a dispersant, the organic solvent, and other optional components by a known method to thereby enable production of the conductive material dispersion liquid. Specifically, the conductive material dispersion liquid can be produced by mixing the above-described components using a mixer such as a disper blade, a ball mill, a sand mill, a bead mill, a pigment disperser, a grinding machine, an ultrasonic disperser, a homogenizer, a planetary mixer, or a FILMIX. Note that the solid content concentration of the conductive material dispersion liquid can be not less than 1 mass % and not more than 25 mass %, for example.

(Slurry Composition for Electrochemical Device Electrode)

The presently disclosed slurry composition for an electrochemical device electrode contains an electrode active material and the presently disclosed conductive material dispersion liquid set forth above, and optionally further contains other components. In other words, the presently disclosed slurry composition contains an electrode active material, a conductive material, the previously described polymer, and an organic solvent, and optionally further contains other components. The presently disclosed slurry composition can cause an electrochemical device to display excellent rate characteristics and high-temperature storage characteristics as a result of containing the conductive material dispersion liquid set forth above.

Although the following describes, as one example, a case in which the electrochemical device is a lithium ion secondary battery and in which the presently disclosed slurry composition for an electrochemical device is a slurry composition for a lithium ion secondary battery positive electrode, the presently disclosed slurry composition for an electrochemical device is not limited to the following example.

<Electrode Active Material>

The electrode active material is a material that gives and receives electrons in an electrode of a secondary battery. A material that can occlude and release lithium is normally used as a positive electrode active material for a lithium ion secondary battery.

Specifically, the positive electrode active material for a lithium ion secondary battery may be a known positive electrode active material such as lithium-containing cobalt oxide ($LiCoO_2$), lithium manganate ($LiMn_2O_4$), lithium-containing nickel oxide ($LiNiO_2$), a lithium-containing complex oxide of Co—Ni—Mn ($Li(Co\ Mn\ Ni)O_2$; $LiNi_{0.8}Co_{0.1}Mn_{0.1}O_2$), a lithium-containing complex oxide of Ni—Mn—Al, a lithium-containing complex oxide of Ni—Co—Al, olivine-type lithium iron phosphate ($LiFePO_4$), olivine-type lithium manganese phosphate ($LiMnPO_4$), a $Li_2MnO_3$—$LiNiO_2$-based solid solution, a lithium-rich spinel compound represented by $Li_{1+x}Mn_{2-x}O_4$ ($0<x<2$), $Li[Ni_{0.17}Li_{0.2}Co_{0.07}Mn_{0.56}]O_2$, or $LiNi_{0.5}Mn_{1.5}O_4$ without any specific limitations.

The particle diameter of the positive electrode active material is not specifically limited and may be the same as that of a conventionally used positive electrode active material.

<Conductive Material>

The conductive material can be any of the conductive materials that can be compounded in the presently disclosed conductive material dispersion liquid set forth above. Note that the amount of the conductive material in the slurry composition is preferably 0.1 parts by mass or more when the amount of the electrode active material is taken to be 100 parts by mass, and is preferably 5 parts by mass or less, and more preferably 2 parts by mass or less when the amount of the electrode active material is taken to be 100 parts by mass. When the amount of the conductive material in the slurry composition is within any of the ranges set forth above, rate characteristics of an obtained electrochemical device can be further enhanced. Moreover, compounding of a smaller amount of the conductive material in the slurry composition while keeping within any of the ranges set forth above is preferable from a viewpoint of increasing the capacity of an electrochemical device.

<Conductive Material Dispersion Liquid>

The presently disclosed conductive material dispersion liquid set forth above is used as the conductive material dispersion liquid. The proportional content of the previously described specific polymer in the slurry composition is a proportional content satisfying any of the proportions described in the "Ratio of polymer and conductive material in conductive material dispersion liquid" section.

<Binder>

A conventionally used binder for a positive electrode such as polyvinylidene fluoride can be used as a binder without any specific limitations. The proportional content of the binder in the slurry composition may, for example, be not less than 0.1 mass % and not more than 5 mass % when all solid content in the slurry composition is taken to be 100 mass %.

<Other Components>

Examples of other components that can be compounded in the slurry composition include, but are not specifically limited to, the same other components as can be compounded in the presently disclosed conductive material dispersion liquid. One other component may be used individually, or two or more other components may be used in combination in a freely selected ratio.

(Production Method of Slurry Composition for Electrochemical Device Electrode)

A feature of a production method of the slurry composition set forth above is that it includes a first step of mixing the above-described polymer, conductive material, and solvent to produce a conductive material dispersion liquid and a second step of mixing the conductive material dispersion liquid obtained in the first step and the electrode active material. The presently disclosed method of producing a slurry composition enables efficient production of the presently disclosed slurry composition.

In the first step, the above-described polymer, conductive material, and solvent are mixed by a known method. The mixing can be performed using any of the various mixers given as examples in the "Production of conductive material dispersion liquid" section. Note that the polymer, conductive material, and solvent can be those that were previously described. Also note that the conductive material dispersion liquid produced in the first step may be in the form of a paste.

In the second step, the conductive material dispersion liquid produced in the first step and the electrode active material are mixed. Further solvent may be added at this time as necessary. The solvent that is used can be the same as that used in the first step. The additive amount of the solvent can be set as appropriate such that the viscosity of the obtained slurry composition is a desired viscosity. Moreover, the mixing can be performed using any of the various mixers given as examples in the "Production of conductive material dispersion liquid" section.

(Electrode for Electrochemical Device)

The presently disclosed electrode for an electrochemical device includes a current collector and an electrode mixed material layer formed on the current collector, wherein the electrode mixed material layer is formed using the slurry composition set forth above. In other words, the electrode mixed material layer contains at least an electrode active material, a conductive material, and the previously described polymer, and optionally contains other components. It should be noted that components contained in the electrode mixed material layer are components that are contained in the previously described slurry composition. Furthermore, the preferred ratio of these components in the electrode mixed material layer is the same as the preferred ratio of these components in the slurry composition. Also note that the polymer serving as a dispersant preferably covers the surface of the conductive material in the electrode mixed material layer. When an electrochemical device is formed, it is possible to inhibit the occurrence of side reactions due to the conductive material in the electrochemical device as a result of the conductive material being covered by the dispersant. Moreover, polymer forming clusters is preferably interposed between the conductive material. These clusters can increase mobility of ions that contribute to an electrochemical reaction in the electrochemical device.

The presently disclosed electrode for an electrochemical device can form an electrochemical device having excellent rate characteristics and high-temperature storage characteristics as a result of being formed using a slurry composition that contains the presently disclosed conductive material dispersion liquid for an electrochemical device.

<Production Method of Electrode>

The presently disclosed electrode for an electrochemical device is produced, for example, through a step of applying the slurry composition set forth above onto the current collector (application step) and a step of drying the slurry composition that has been applied onto the current collector so as to form an electrode mixed material layer on the current collector (drying step).

[Application Step]

The slurry composition can be applied onto the current collector by any commonly known method without any specific limitations. Specific examples of application methods that can be used include doctor blading, dip coating, reverse roll coating, direct roll coating, gravure coating, extrusion coating, and brush coating. During application, the slurry composition may be applied onto one side or both sides of the current collector. The thickness of the slurry coating on the current collector after application but before drying may be set as appropriate in accordance with the thickness of the electrode mixed material layer to be obtained after drying.

The current collector onto which the slurry composition is applied is a material having electrical conductivity and electrochemical durability. Specifically, the current collector may, for example, be made of iron, copper, aluminum, nickel, stainless steel, titanium, tantalum, gold, platinum, or the like. One of these materials may be used individually, or two or more of these materials may be used in combination in a freely selected ratio.

[Drying Step]

The slurry composition on the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry composition on the current collector in this manner, an electrode mixed material layer can be formed on the current collector to thereby obtain an electrode for an electrochemical device that includes the current collector and the electrode mixed material layer.

After the drying step, the electrode mixed material layer may be further subjected to a pressing process, such as mold pressing or roll pressing. The pressing process can improve close adherence between the electrode mixed material layer and the current collector. Furthermore, in a case in which the electrode mixed material layer contains a curable polymer, the polymer is preferably cured after the electrode mixed material layer has been formed.

(Electrochemical Device)

The presently disclosed electrochemical device includes the presently disclosed electrode for an electrochemical device. Moreover, the presently disclosed electrochemical device has excellent battery characteristics such as rate characteristics and high-temperature storage characteristics as a result of including the presently disclosed electrode for an electrochemical device. The presently disclosed electrochemical device may, for example, be an electric double-layer capacitor or a non-aqueous secondary battery such as a lithium ion secondary battery. In a case in which the presently disclosed electrochemical device is a non-aqueous secondary battery such as a lithium ion secondary battery, the non-aqueous secondary battery includes a positive electrode, a negative electrode, an electrolyte solution, and a separator, and the presently disclosed electrode for an electrochemical device is used as at least one of the positive electrode and the negative electrode. The non-aqueous secondary battery that is an example of the presently disclosed electrochemical device is preferably a non-aqueous secondary battery in which the presently disclosed electrode for an electrochemical device is used as a positive electrode. Although the following describes, as one example, a case in which the electrochemical device is a lithium ion secondary battery, the presently disclosed electrochemical device is not limited to the following example.

<Electrode>

Examples of electrodes other than the electrode for an electrochemical device set forth above that can be used in a lithium ion secondary battery that is an example of the presently disclosed electrochemical device include known electrodes used in production of lithium ion secondary batteries without any specific limitations. Specifically, an electrode obtained by forming an electrode mixed material layer on a current collector by a known production method can be used as an electrode other than the electrode for an electrochemical device set forth above.

<Electrolyte Solution>

The electrolyte solution is normally an organic electrolyte solution in which a supporting electrolyte is dissolved in an organic solvent. The supporting electrolyte of the lithium ion secondary battery may, for example, be a lithium salt. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of organic solvents that can suitably be used include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region, and a mixture of ethylene carbonate and diethyl carbonate is more preferable.

The concentration of the electrolyte in the electrolyte solution may be adjusted as appropriate. Moreover, known additives such as vinylene carbonate, for example, can be added to the electrolyte solution.

<Separator>

Examples of the separator include, but are not specifically limited to, separators described in JP2012-204303A. Of these separators, a microporous membrane made of polyolefinic (polyethylene, polypropylene, polybutene, or polyvinyl chloride) resin is preferred since such a membrane can reduce the total thickness of the separator, which increases the ratio of electrode active material in the lithium ion secondary battery, and consequently increases the volumetric capacity.

<Production Method of Electrochemical Device>

The lithium ion secondary battery that is an example of the electrochemical device can be produced by, for example, stacking the positive electrode and the negative electrode with the separator in-between, performing rolling, folding, or the like of the resultant laminate in accordance with the battery shape, as necessary, in order to place the laminate in a battery container, injecting the electrolyte solution into the battery container, and sealing the battery container. In order to prevent pressure increase inside the lithium ion secondary battery and occurrence of overcharging or overdischarging, an overcurrent preventing device such as a fuse or a PTC device, an expanded metal, or a lead plate may be provided as necessary. The shape of the lithium ion secondary battery may be a coin type, a button type, a sheet type, a cylinder type, a prismatic type, a flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer. Furthermore, in the case of a polymer that is a hydrogenated polymer obtained through hydrogenation of a polymerized product including conjugated diene monomer units, the total proportional content of non-hydrogenated conjugated diene monomer units and alkylene structural units that are hydrogenated conjugated diene monomer units in the hydrogenated polymer is the same as the ratio (charging ratio) of a conjugated diene monomer among all monomers used in polymerization of the polymerized product.

Various measurements and evaluations in the examples and comparative examples were performed as follows.

<Zeta Potential of Conductive Material Dispersion Liquid>

Measurement of the zeta potential of a conductive material dispersion liquid was performed in a 25° C. environment by an ultrasound method (DT-1202 produced by Dispersion Technology Inc.). Terminals were of a coaxial cylindrical shape, and the potential difference between a central part and the periphery thereof was measured. Measurement of the zeta potential of the conductive material dispersion liquid was performed without pH adjustment and using a CVI (Colloid Vibration Current) value measured in advance for just the dispersion medium as a background. Note that a value obtained through particle size distribution measurement of the conductive material dispersion liquid by an ultrasound method using the same apparatus was used as the particle diameter in measurement, and the volume density of particles was taken to be 2.2 g/cm$^3$. In a case in which the solid content concentration of the conductive material dispersion liquid was 7 mass % or more, the conductive material dispersion liquid was diluted with the dispersion medium and adjusted to 7 mass % before being measured.

<Adsorbed Amount (X) of Dispersant to Conductive Material>

A conductive material dispersion liquid obtained in each example or comparative example was diluted with NMP such as to have a solid content concentration of 3 mass % with a conductive material and a dispersant as solid content. Thereafter, the solid content was caused to sediment using a centrifuge (rotation speed: 1,000 rpm). The supernatant was removed, and the remaining solid content was dried at 120° C. for 2 hours in an inert oven. The mass of the obtained solid content (dry material) was taken to be the initial weight (100%). The weight change rate of the obtained solid content up to 600° C. was then confirmed using a thermogravimetric differential thermal analyzer (Tg-dTA). The weight loss (%) at from 300° C. to 550° C. (i.e., the difference between the weight change rate (%) at 300° C. and the weight change rate (%) at 550° C.) was taken to be the mass (A) of the dispersant that was adsorbed to the conductive material, the mass obtained by subtracting the weight loss (%) at from 300° C. to 550° C. from the initial weight (100%) was taken to be the total mass (B) of the conductive material, and the adsorbed amount (X) was calculated by the following formula (1). Note that the measurement temperature range of 300° C. to 550° C. was set with the intention off ensuring that a temperature range of ±100° C. based on the thermal decomposition temperature of the measurement subject polymer was included in the measurement temperature range. Also note that the lower limit temperature of the measurement temperature range was set such as to not fall below 250° C. from a viewpoint of eliminating the influence of solvent.

Adsorbed amount (X) [mg/m$^2$]=Mass (A) of dispersant adsorbed to conductive material [mg]/Total mass (B) of conductive material [mg]×1000/ Specific surface area (S) of conductive material [m$^2$/g]    (1)

<Dynamic Light Scattering Measurement of Polymer>

An NMP solution of a polymer produced in each example or comparative example was adjusted to a solid content concentration of 0.3 mass % and was then stirred at 60 rpm for at least 30 minutes using a shaking machine until dissolution was confirmed in order to obtain a polymer NMP solution as a measurement subject. A particle diameter distribution by volume was measured for the obtained measurement subject at 25° C. using a dynamic light scattering measurement device (ELSZ-2000S produced by Otsuka Electronics Co., Ltd.). In the obtained particle diameter distribution (vertical axis: scattering intensity; horizontal axis: particle diameter), the particle diameter at which cumulative intensity calculated from the small diameter end of the distribution reached 50% of the overall intensity was taken to be a value (A) for volume-average particle diameter D50.

Moreover, a "peak" in this particle diameter distribution was defined based on the height of the largest peak in the particle diameter distribution as a peak having a height equivalent to 5% or more of the height of the largest peak. Furthermore, a value for a particle diameter corresponding to a largest peak among one or more peaks in a particle diameter range of not less than 5 μm and not more than 30 μm was defined as (B).

Note that in measurement of the particle diameter distribution, the permittivity of NMP was set as 32.2, the viscosity was set as 1.89 cP, and the refractive index was set as 1.4670.

<Iodine Value of Polymer>

Vacuum drying of 100 g of a polymer produced in each example or comparative example (polymer prior to dissolution in NMP) was performed at a temperature of 60° C. for 12 hours. The iodine value (mg/100 mg) of the obtained dry polymer was then measured in accordance with JIS K6235 (2006).

<Surface Base Content and Ratio of Surface Acid Content Relative to Surface Base Content of Conductive Material>

<<Surface Acid Content>>

Approximately 1 g of measurement subject CNTs were precisely weighed, were then immersed in 100 mL of 0.01 mol $dm^{-3}$ tetrabutylhydride (TBA OH)/4-methyl-2-pentanone (MIBK) solution, and were stirred by a stirrer for 1 hour. Thereafter, centrifugal separation was performed, and the supernatant was filtered using a filter. Residual TBA OH in 50 mL of the resultant filtrate was quantitatively analyzed by performing non-aqueous coulometric titration with 0.01 mol $dm^{-3}$ perchloric acid ($HClO_4$)/MIBK solution, and then the acid content (mmol/g) per 1 g of CNTs was determined from the obtained value. Note that this analysis was performed using an automatic coulometric titrator (produced by Kyoto Electronics Manufacturing Co., Ltd.; product name: AT-700). Also note that this sequence of operations was performed under argon gas flow at room temperature.

<<Surface Base Content>>

Approximately 1 g of measurement subject CNTs were precisely weighed, were then immersed in 100 mL of 0.01 mol $dm^{-3}$ $HClO_4$/MIBK solution, and were stirred by a stirrer for 1 hour. Thereafter, centrifugal separation was performed, and the supernatant was filtered using a filter. Residual $HClO_4$ in 50 mL of the resultant filtrate was quantitatively analyzed by performing non-aqueous coulometric titration with 0.01 mol $dm^{-3}$ TBA OH/MIBK solution, and then the base content (mmol/g) per 1 g of CNTs was determined from the obtained value. Note that this analysis was performed using an automatic coulometric titrator (produced by Kyoto Electronics Manufacturing Co., Ltd.; product name: AT-700). Also note that this sequence of operations was performed under argon gas flow at room temperature.

<<Ratio of Surface Acid Content Relative to Surface Base Content>>

The value for the surface acid content obtained as described above was divided by the value for the surface base content obtained as described above so as to calculate a ratio of the surface acid content relative to the surface base content.

<Specific Surface Area>

The specific surface area (BET specific surface area) of CNTs was measured using a Belsorp-mini (produced by MicrotracBEL Corp.; conforming with ASTM D3037-81).

<Viscosity of Conductive Material Dispersion Liquid>

The viscosity of a conductive material dispersion liquid obtained in each example or comparative example was measured for 120 seconds at a temperature of 25° C. and a shear rate of 10 (1/s) using a rheometer (MCR 302 produced by Anton Paar), and an average value was calculated for viscosity measurement values from 61 seconds to 120 seconds. A lower obtained viscosity value indicates better dispersion of a conductive material in the conductive material dispersion liquid.

<Stability Over Time of Conductive Material Dispersion Liquid>

For a conductive material dispersion liquid produced in each example or comparative example, a value for viscosity straight after production and a value for viscosity 7 days after production were each measured. Note that in measurement of viscosity 7 days after production, the conductive material dispersion liquid was stirred for 1 hour using a planetary mixer (rotation speed: 60 rpm), and then the viscosity was measured. In each viscosity measurement, the viscosity was measured for 120 seconds at a temperature of 25° C. and a shear rate of 10 (1/s) using a rheometer (MCR 302 produced by Anton Paar), and an average value was calculated for viscosity measurement values from 61 seconds to 120 seconds. A viscosity maintenance rate M (%) was calculated by determining a ratio of the value for viscosity 7 days after production relative to the value for viscosity straight after production. A value of closer to 100% for the viscosity maintenance rate M (%) indicates that the conductive material dispersion liquid has a lower tendency to thicken over time (i.e., has better dispersion state stability over time). By using a conductive material dispersion liquid having excellent dispersion state stability over time, it is possible to produce a uniform slurry composition and positive electrode, to increase initial efficiency of an electrochemical device including this positive electrode, and to reduce resistance.

A: M of not less than 80% and not more than 120%
    B: M of not less than 60% and less than 80% or M of more than 120% and less than 140%
    C: M of not less than 40% and less than 60% or M of more than 140% and less than 160%
    D: M of less than 40% or M of more than 160%

<Rate Characteristics>

A lithium ion secondary battery produced as an electrochemical device in each example or comparative example was left at rest at a temperature of 25° C. for 5 hours after injection of electrolyte solution. Next, the lithium ion secondary battery was charged to a cell voltage of 3.65 V by a 0.2 C constant-current method at a temperature of 25° C., and was then subjected to 12 hours of aging at a temperature of 60° C. The lithium ion secondary battery was subsequently discharged to a cell voltage of 3.00 V by a 0.2 C constant-current method at a temperature of 25° C. Thereafter, the lithium ion secondary battery was CC-CV charged with a 0.2 C constant current (upper limit cell voltage 4.20 V) and was then CC discharged to a cell voltage of 3.00 V with a 0.2 C constant current. This charging and discharging at 0.2 C was repeated three times.

Next, 0.2 C constant-current charging and discharging was performed between cell voltages of 4.20 V and 3.00 V in an environment having a temperature of 25° C., and the discharge capacity at that time was defined as C0. Thereafter, the lithium ion secondary battery was CC-CV charged with a 0.2 C constant current in the same manner, was then CC discharged to 3.00 V with a 3.0 C constant current in an environment having a temperature of 25° C., and the discharge capacity at that time was defined as C1. A ratio (percentage; capacity maintenance rate) of the discharge capacity (C1) at 3.0 C relative to the discharge capacity (C0) at 0.2 C, expressed by (C1/C0)×100(%), was determined as a rate characteristic and was evaluated by the following standard. A larger value for the capacity maintenance rate indicates less reduction of discharge capacity at high current and lower internal resistance (i.e., better rate characteristics).

A: Capacity maintenance rate of 70% or more
B: Capacity maintenance rate of not less than 65% and less than 70%
C: Capacity maintenance rate of not less than 55% and less than 65%
D: Capacity maintenance rate of less than 55%

<High-Temperature Storage Characteristics>

A lithium ion secondary battery produced as an electrochemical device in each example or comparative example was left at rest at a temperature of 25° C. for 5 hours after injection of electrolyte solution. Next, the lithium ion secondary battery was charged to a cell voltage of 3.65 V by a 0.2 C constant-current method at a temperature of 25° C., and was then subjected to 12 hours of aging at a temperature of 60° C. The lithium ion secondary battery was subsequently discharged to a cell voltage of 3.00 V by a 0.2 C constant-current method at a temperature of 25° C. Thereafter, the lithium ion secondary battery was CC-CV charged with a 0.2 C constant current (upper limit cell voltage 4.20 V) and was then CC discharged to a cell voltage of 3.00 V with a 0.2 C constant current. This charging and discharging at 0.2 C was repeated three times. The discharge capacity of the $3^{rd}$ cycle at 0.2 C was taken to be the initial capacity Cx. CC-CV charging was subsequently performed with a 0.2 C constant current (upper limit cell voltage 4.20 V). Next, the lithium ion secondary battery was stored for 4 weeks inside an inert oven in which the inside of a treatment chamber had been set to a nitrogen atmosphere of 60° C. Thereafter, the lithium ion secondary battery was discharged to a cell voltage of 3.00 V by a 0.2 C constant-current method, and the discharge capacity at that time was taken to be Cy.

A high-temperature capacity maintenance rate expressed by (Cy/Cx)×100(%) was determined and was evaluated by the following standard. A larger value for this high-temperature capacity maintenance rate indicates that there is less degradation of the battery during high-temperature storage (i.e., better high-temperature storage characteristics).

A: High-temperature capacity maintenance rate of 80% or more
B: High-temperature capacity maintenance rate of not less than 75% and less than 80%
C: High-temperature capacity maintenance rate of not less than 70% and less than 75%
D: High-temperature capacity maintenance rate of less than 70%

Example 1

A lithium ion secondary battery including a presently disclosed positive electrode for an electrochemical device was produced as one example of the presently disclosed electrochemical device. The following describes each step in detail.

<Preparation of Surface-Treated CNTs>

Multi-walled carbon nanotubes (specific surface area: 300 m²/g) that had been weighed out in an amount of 1 g were added to a mixed solution of 40 mL of concentrated nitric acid and 40 mL of 2 M sulfuric acid and were stirred for 1 hour while being kept at 60° C. (acid treatment). Thereafter, solid-liquid separation was performed by filtration using filter paper (Toyo Roshi Kaisha, Filter Paper No. 2, 125 mm). Solids on the filter paper were washed using 200 mL of purified water, and then CNT solids (acid-treated CNTs) were collected. These CNT solids were added into 200 mL of lithium hydroxide aqueous solution having a concentration of 2.5 mol/L and were subsequently stirred for 2 hours while being kept at 25° C. in a water bath (base treatment). Thereafter, solid-liquid separation was performed by vacuum filtration using a membrane filter having a pore diameter of 10 μm. CNT solids (acid/base-treated CNTs) on the membrane filter were repeatedly washed using purified water. Once the electrical conductivity of washing water reached 50 μS/m or less, solid-liquid separation of the CNT solids was performed by the same method as described above. The obtained CNT solids were dried under reduced pressure at 50° C. for 8 hours to thereby produce surface-treated CNTs. The specific measurements described above were performed with respect to these surface-treated CNTs in order to determine the surface base content, the ratio of the surface acid content relative to the surface base content, and the specific surface area. The results are shown in Table 1.

<Production of Polymer (Dispersant)>

A reactor having an internal capacity of 10 L was charged with 100 parts of deionized water, 35 parts of acrylonitrile as a nitrile group-containing monomer, and 65 parts of 1,3-butadiene as a conjugated diene monomer, and then 2 parts of potassium oleate as an emulsifier, 0.1 parts of potassium phosphate as a stabilizer, and 0.8 parts of tert-dodecyl mercaptan (TDM) as a molecular weight modifier were further added, and emulsion polymerization was performed at 30° C. in the presence of 0.35 parts of potassium persulfate as a polymerization initiator so as to copolymerize the butadiene and acrylonitrile.

At the point at which the polymerization conversion rate reached 95%, 0.2 parts of hydroxylamine sulfate was added per 100 parts of monomer to terminate polymerization. Next, heating was performed, steam distillation was performed at approximately 90° C. under reduced pressure to recover residual monomer, and then 0.1 parts of dibutylhydroxytoluene (BHT) was added as an antioxidant to yield a water dispersion of a polymerized product.

Next, a 25 mass % aqueous solution of calcium chloride was added under stirring such that the amount of calcium chloride was 3 parts relative to 100 parts of polymerized product solid content in the obtained water dispersion, and the polymerized product in the water dispersion was caused to coagulate. Thereafter, the polymerized product was separated by filtration, 50 equivalents of deionized water relative to the obtained polymerized product was passed to perform water washing, and then drying was performed at 90° C. under reduced pressure to yield a pre-hydrogenation polymer.

Next, the pre-hydrogenation polymer was hydrogenated by adopting oil-layer hydrogenation as the method of hydrogenation. The pre-hydrogenation polymer was dissolved in acetone with a concentration of 12% to obtain an acetone solution of the pre-hydrogenation polymer that was a subject for hydrogenation. This acetone solution was loaded into an autoclave, 500 mass ppm of a palladium/silica catalyst (amount in terms of palladium) was added relative to 100 mass % of the pre-hydrogenation polymer (hydrogenation subject), and then a hydrogenation reaction was performed at 90° C. and a hydrogen pressure of 3.0 MPa for 6 hours to yield a hydrogenation reaction product. Once the hydrogenation reaction had ended, the palladium/silica catalyst was filtered off, and acetone serving as a solvent was removed under reduced pressure to yield a target polymer. The obtained polymer was confirmed to include a nitrile group-containing monomer unit and an alkylene structural unit upon analysis of the polymer by 1H-NMR. Moreover, when an acetone solution in which the polymer was dissolved was analyzed by gas chromatography, BHT, which is a substituted phenol compound, was confirmed to be included in an amount of 0.01 mass % or more based on the total mass of the polymer.

The obtained polymer was dissolved in a specific amount of NMP to obtain an NMP solution having the polymer dissolved with a solid content concentration of 8% in NMP.

Note that a polymer was confirmed to include a nitrile group-containing monomer unit and an alkylene structural unit in the same manner in Examples 2 to 10 and Comparative Examples 1 to 4 that are described further below. Moreover, BHT, which is a substituted phenol compound, was confirmed to be included in an amount of 0.01 mass % or more based on the total mass of the polymer in each of Examples 2 to 10.

<Production of Conductive Material Dispersion Liquid>

After adding 5 parts of the surface-treated CNTs (BET specific surface area: 300 m$^2$/g) prepared as described above as a conductive material, 12.5 parts (equivalent to 1 part as solid content) of the 8% NMP solution of the polymer obtained as described above, and 82.5 parts of NMP as an organic solvent into a mixing vessel, these materials were stirred (3,000 rpm, 10 minutes) using a disper blade. The obtained mixture was then mixed at a circumferential speed of 8 m/s for 1 hour using a bead mill (LMZ015 produced by Ashizawa Finetech Ltd.) in which zirconia beads of 1 mm in diameter were used to thereby produce a conductive material dispersion liquid.

The viscosity of the produced conductive material dispersion liquid, measured as previously described, was 3.8 Pa·s. Moreover, the stability over time of the produced conductive material dispersion liquid was evaluated as previously described.

<Production of Slurry Composition for Electrochemical Device Positive Electrode>

A slurry for a positive electrode was produced by adding 100 parts of a ternary active material having a layered structure (LiNi$_{0.8}$Co$_{0.1}$Mn$_{0.1}$O$_2$) (average particle diameter: 10 μm) as a positive electrode active material, 1.1 parts of polyvinylidene fluoride (PVdF) as a binder, 1.0 parts (in terms of solid content) of the conductive material dispersion liquid, and NMP into a vessel and mixing (60 rpm, 30 minutes) these materials using a planetary mixer. Note that the additive amount of NMP was adjusted such that the viscosity of the obtained slurry composition for a positive electrode was within a range of 4,000 mPa·s to 5,000 mPa·s. The viscosity of the slurry composition for a positive electrode was measured in accordance with JIS Z8803:1991 by a B-type viscometer. During this measurement, the measurement temperature was 25° C. and the rotation speed was 60 rpm.

<Production of Positive Electrode>

Aluminum foil of 20 μm in thickness was prepared as a current collector. The slurry composition for a positive electrode was applied onto both sides of the aluminum foil by a comma coater such as to have a coating weight after drying of 20 mg/cm$^2$ at each side, was dried at 90° C. for 20 minutes and at 120° C. for 20 minutes, and was then heat treated at 60° C. for 10 hours to obtain a positive electrode web. This positive electrode web was rolled by roll pressing to produce a sheet-shaped positive electrode including a positive electrode mixed material layer of 3.2 g/cm$^3$ in density and aluminum foil. The thickness of the sheet-shaped positive electrode was 70 μm. This sheet-shaped positive electrode was cut to 4.8 cm in width and 50 cm in length to obtain a positive electrode for a lithium ion secondary battery.

<Production of Negative Electrode>

A 5 MPa pressure-resistant vessel equipped with a stirrer was charged with 33 parts of 1,3-butadiene as an aliphatic conjugated diene monomer, 3.5 parts of itaconic acid as a carboxy group-containing monomer, 63.5 parts of styrene as an aromatic vinyl monomer, 0.4 parts of sodium dodecylbenzenesulfonate as an emulsifier, 150 parts of deionized water, and 0.5 parts of potassium persulfate as a polymerization initiator. These materials were thoroughly stirred and were then heated to 50° C. to initiate polymerization. At the point at which the polymerization conversion rate reached 96%, cooling was performed to quench the polymerization reaction and yield a mixture containing a particulate binder (styrene-butadiene copolymer). The mixture was adjusted to pH 8 through addition of 5% sodium hydroxide aqueous solution and was then subjected to thermal-vacuum distillation to remove unreacted monomer. Thereafter, the mixture was cooled to 30° C. or lower to obtain a water dispersion containing a binder for a negative electrode.

Next, 48.75 parts of artificial graphite and 48.75 parts of natural graphite as negative electrode active materials and 1 part of carboxymethyl cellulose as a thickener were loaded into a planetary mixer. These materials were diluted to a solid content concentration of 60% with deionized water and were subsequently kneaded at a rotation speed of 45 rpm for 60 minutes. Thereafter, 1.5 parts in terms of solid content of the water dispersion containing the binder for a negative electrode obtained as described above was added and was kneaded therewith at a rotation speed of 40 rpm for 40 minutes. Deionized water was added to adjust the viscosity to 3,000±500 mPa·s (measured by B-type viscometer at 25° C. and 60 rpm) and thereby produce a slurry composition for a negative electrode mixed material layer.

Next, copper foil of 15 μm in thickness was prepared as a current collector. The slurry composition for a negative electrode mixed material layer was applied onto both sides of the copper foil such as to have a coating weight after drying of 10 mg/cm$^2$ at each side and was dried at 60° C. for 20 minutes and at 120° C. for 20 minutes. Thereafter, 2 hours of heat treatment was performed at 150° C. to obtain a negative electrode web. This negative electrode web was rolled by roll pressing to produce a sheet-shaped negative electrode including a negative electrode mixed material layer of 1.6 g/cm$^3$ in density and copper foil. The sheet-shaped negative electrode was cut to 5.0 cm in width and 52 cm in length to obtain a negative electrode for a lithium ion secondary battery.

<Production of Electrochemical Device (Lithium Ion Secondary Battery)>

The produced positive electrode for a lithium ion secondary battery and negative electrode for a lithium ion secondary battery were wound up with the electrode mixed material layers thereof facing each other and with a separator (microporous membrane made of polyethylene) of 15 μm in thickness in-between using a core of 20 mm in diameter so as to obtain a roll. The obtained roll was compressed to a thickness of 4.5 mm from one direction at a rate of 10 mm/s. Note that the compressed roll had an elliptical shape in plan view, and the ratio of the major axis and the minor axis (major axis/minor axis) was 7.7.

In addition, a $LiPF_6$ solution of 1.0 M in concentration (solvent: mixed solvent of ethylene carbonate (EC)/diethyl carbonate (DEC)=3/7 (volume ratio); additive: containing 2 volume % (solvent ratio) of vinylene carbonate) was prepared as an electrolyte solution.

The compressed roll was subsequently enclosed in a laminate case made of aluminum together with 3.2 g of the non-aqueous electrolyte solution. A nickel lead was connected to a specific position on the negative electrode, an aluminum lead was connected to a specific position on the positive electrode, and then an opening of the case was heat sealed to obtain a lithium ion secondary battery. This lithium ion secondary battery had a pouch shape of a specific size capable of accommodating the roll. The nominal capacity of the battery was 700 mAh.

Various evaluations of the obtained lithium ion secondary battery were performed as previously described.

Examples 2 to 4

Various operations and evaluations were performed in the same way as in Example 1 with the exception that the amount of antioxidant or the amounts of monomers used in production of the polymer were changed as indicated in Table 1 so as to obtain a polymer satisfying a value (A) for volume-average particle diameter D50 and a value (B) for a specific particle diameter indicated in Table 1. The results are shown in Table 1. The viscosities of conductive material dispersion liquids produced in these examples, measured as previously described, were 3.9 Pa·s in Example 2, 3.6 Pa·s in Example 3, and 4.8 Pa·s in Example 4.

Example 5

Various operations and evaluations were performed in the same way as in Example 1 with the exception that the hydrogenation reaction conditions in production of the polymer (specifically, the amount of catalyst and the hydrogenation reaction time) were changed such that the iodine value of the obtained polymer changed to 55 mg/100 mg. The results are shown in Table 1. The viscosity of the conductive material dispersion liquid produced in this example, measured as previously described, was 4.9 Pa·s.

Example 6

Various operations and evaluations were performed in the same way as in Example 1 with the exception that in production of the polymer, the drying temperature when obtaining a pre-hydrogenation polymer was changed to 110° C. and the hydrogenation reaction temperature was changed to 110° C. The results are shown in Table 1. The viscosity of the conductive material dispersion liquid produced in this example, measured as previously described, was 5 Pa·s.

Example 7

Various operations and evaluations were performed in the same way as in Example 1 with the exception that in production of the polymer, the amount of TDM used as a molecular weight modifier was changed to 0.5 parts, the drying temperature when obtaining a pre-hydrogenation polymer was changed to 110° C., and the hydrogenation reaction temperature was changed to 110° C. The results are shown in Table 1. The viscosity of the conductive material dispersion liquid produced in this example, measured as previously described, was 16 Pa·s.

Example 8

Various operations and evaluations were performed in the same way as in Example 1 with the exception that the amount of TDM used as a molecular weight modifier in production of the polymer was changed to 1.5 parts. The results are shown in Table 1. The viscosity of the conductive material dispersion liquid produced in this example, measured as previously described, was 3.1 Pa·s.

Example 9

Various operations and evaluations were performed in the same way as in Example 1 with the exception that the base treatment time in production of the surface-treated CNTs was changed to 1 hour. The results are shown in Table 1. The viscosity of the conductive material dispersion liquid produced in this example, measured as previously described, was 4.9 Pa·s.

Example 10

Various operations and evaluations were performed in the same way as in Example 1 with the exception that the acid treatment time in production of the surface-treated CNTs was changed to 2 hours. The results are shown in Table 1. The viscosity of the conductive material dispersion liquid produced in this example, measured as previously described, was 4.9 Pa·s.

Comparative Example 1

Various operations and evaluations were performed in the same way as in Example 1 with the exception that a hydrogenated polymer produced as described below was used instead of the specific polymer. The results are shown in Table 1. The viscosity of the conductive material dispersion liquid produced in this example, measured as previously described, was at least 50 Pa·s (exceeding device limit of detection). Moreover, a "peak" of a specific size was not detected in a particle diameter range of not less than 5 μm and not more than 30 μm in a particle diameter distribution.

<Production of Hydrogenated Polymer>

In a metal bottle, 0.2 parts of sodium carbonate was dissolved in 200 parts of deionized water. Next, 2.5 parts of potassium caprate (soap of a fatty acid having a carbon number of 10) was added to the metal bottle as an emulsifier. An aqueous solution containing 1.0 parts of a naphthalene-sulfonic acid-formaldehyde polycondensate was further added as a dispersant. Thereafter, 35 parts of acrylonitrile as a nitrile group-containing monomer and 0.8 parts of t-dodecyl mercaptan as a molecular weight modifier were added to the metal bottle in this order. Gas inside the metal bottle was purged three times with nitrogen and then 65 parts of 1,3-butadiene was added as a conjugated diene monomer. The metal bottle was maintained at 5° C. while adding a redox polymerization initiator that was a combination of 0.1 parts of cumene hydroperoxide, 0.01 parts of ethylenediaminetetraacetic acid iron monosodium salt hydrate, 0.03 parts of sodium hydroxymethanesulfinate dihydrate, and 0.02 parts of EDTA·4Na·4H$_2$O. The temperature was then maintained at 5° C. for 16 hours while carrying out a polymerization reaction. Once the degree of polymerization reached 90%, the polymerization reaction was terminated through addition of 0.1 parts of hydroxylamine sulfate and 0.03 parts of diethylhydroxylamine as polymerization inhibitors. Residual monomer was removed using a rotary evaporator with a water temperature of 60° C. to yield a latex of a polymer including a conjugated diene monomer unit and a nitrile group-containing monomer unit. The polymer concentration at this time was 25 mass %.

A portion of the obtained latex was added to magnesium sulfate aqueous solution of an amount of 12 mass % relative to polymer solid content and was stirred therewith to coagulate the latex. Thereafter, filtration was performed with washing using water to obtain coagulated material that was then vacuum dried at a temperature of 60° C. for 12 hours to yield a nitrile rubber as a polymer.

Next, 9 parts of the obtained polymer was dissolved in 141 parts of monochlorobenzene and was loaded into a reactor. The reactor was heated to 80° C. and then 2 L of a monochlorobenzene solution containing bis(tricyclohexylphosphine)benzylidene ruthenium dichloride as a Grubbs' catalyst was added thereto such that the amount of the Grubbs' catalyst was 0.25 parts relative to 100 parts of the polymer. The internal pressure of the reactor was raised to 3.5 MPa with ethylene as a co-olefin, and a metathesis reaction of the polymer was carried out at a stirring rate of 600 rpm. During the reaction, a constant temperature was maintained using a cooling coil connected to a temperature controller and a heat sensor.

Next, the inside of the reactor was degassed three times with 0.7 MPa H$_2$ while continuing stirring. The temperature of the reactor was then raised to 50° C., and 1 L of a monochlorobenzene solution containing Wilkinson's catalyst and triphenylphosphine was added to the reactor. The amount of Wilkinson's catalyst was 0.075 parts per 100 parts of the polymer, and the amount of triphenylphosphine was 1 part per 100 parts of the polymer. The temperature was then maintained at 50° C. while performing a hydrogenation reaction of the polymer under a hydrogen pressure (gauge pressure) of 8.4 MPa, and the reaction was ended with an iodine value of 5 mg/100 mg as the end point. After the reaction had ended, 0.2 parts of activated carbon having an average diameter of 15 μm was added into the reactor and was stirred for 30 minutes. Thereafter, filtration was carried out using a filter having a pore diameter of 5 μm. Steam was introduced into the filtrate, and monochlorobenzene was removed and recovered through steam distillation. Precipitated polymer (hydrogenated polymer) was recovered by separation and drying.

After sampling 64 parts in terms of solid content of a water dispersion of the obtained hydrogenated polymer, 800 parts of N-methylpyrrolidone (NMP) as a solvent was added thereto, and then water was evaporated under reduced pressure to yield an NMP solution containing the hydrogenated polymer.

Comparative Example 2

Various operations and evaluations were performed in the same way as in Example 1 with the exception that a hydrogenated polymer produced as described below was used instead of the specific polymer. The results are shown in Table 1. The viscosity of the conductive material dispersion liquid produced in this example, measured as previously described, was 21 Pa·s. Moreover, a "peak" of a specific size was not detected in a particle diameter range of not less than 5 μm and not more than 30 μm in a particle diameter distribution.

<Production of Hydrogenated Polymer>

A pre-hydrogenation polymer was produced by a batch process in a stirring autoclave having a capacity of 2 m$^3$. In each batch, 350 kg of a monomer composition (acrylonitrile: 1,3-butadiene=35:65 (by mass)) and 700 kg (total amount) of water were used. First, the autoclave was charged with 9.8 kg of Erkantol® BXG (Erkantol is a registered trademark in Japan, other countries, or both), 2.94 kg of Baykanol® PQ (Baykanol is a registered trademark in Japan, other countries, or both), and 1.96 kg of coconut fatty acid potassium salt as emulsifiers in 600 kg of water together with 180 g of potassium hydroxide, and was purged using a stream of nitrogen. After the nitrogen purging was complete, monomers (196 kg of butadiene and 154 kg of acrylonitrile) from which a stabilizer had been removed and one portion of tert-dodecyl mercaptan (0.4 parts relative to 100 parts of monomer composition) were added into the reactor. The reactor was subsequently closed. The remaining amount of water (100 kg) was used to produce an aqueous solution of tris(α-hydroxyethyl)amine and potassium peroxodisulfate and a polymerization inhibitor solution. Aqueous solution containing 950 g of potassium peroxodisulfate (0.27 parts) and 530 g of tris(α-hydroxyethyl)amine (0.15 parts) was added to thereby initiate polymerization at 20° C., and this temperature was maintained throughout the entire polymerization time. Progression of polymerization was monitored in each case through gravimetric analysis of the conversion rate. Once the polymerization conversion rate was 15%, further tert-dodecyl mercaptan (0.4 parts relative to 100 parts of monomer composition) was added. After 7 hours of polymerization time, an aqueous solution of sodium dithionite/N,N-diethylhydroxylamine (DEHA) and potassium hydroxide was added to terminate polymerization. The polymerization conversion rate was 85%. Steam distillation was performed so as to remove unconverted monomer and other volatile components.

In addition, 0.25 parts of dibutylhydroxytoluene as an antioxidant was added to a water dispersion of a polymerization reaction product obtained in this manner.

Next, a 25 mass % aqueous solution of calcium chloride was added under stirring such that the amount of calcium chloride was 2.37 parts relative to 100 parts of polymerized product solid content in the obtained water dispersion, and the polymerized product in the water dispersion was caused to coagulate. Thereafter, the polymerized product was separated by filtration, 50 equivalents of deionized water relative to the obtained polymerized product was passed to perform water washing, and then drying was performed at 70° C. under reduced pressure to yield a pre-hydrogenation polymer.

Next, a hydrogenation reaction was performed with a hydrogen pressure of 190 bar, a temperature of 138° C., and a solid content of 17.5%. Note that the hydrogenation reaction was performed using 0.15% of tris(triphenylphosphine)rhodium(I) chloride (Evonik-Degussa) as a catalyst and 0.2 phr of triphenylphosphine (Merck Schuchardt OHG; Catalogue No. 8.08270) as a promotor based on 100 g of the pre-hydrogenation polymer (phr).

In the hydrogenation reaction, 5.25 kg of the pre-hydrogenation polymer was dissolved in 24.25 kg of chlorobenzene to obtain a polymer solution in a 40 L autoclave. Prior to the hydrogenation reaction, this polymer solution was continuously brought into contact with nitrogen (20 bar) once and hydrogen (20 bar) twice under stirring, and was then depressurized. This reaction mixture was heated to 120° C. and was brought into contact with 190 bar of hydrogen. In the next step, 10.5 g of the triphenylphosphine promotor as a solution in 250 g of chlorobenzene was added by metered injection. Hydrogenation was then initiated through addition of 7.875 g of tris(triphenylphosphine)rhodium(I) chloride dissolved in 250 g of chlorobenzene. The internal temperature gradually increased to 138° C. as the reaction diminished. Online monitoring of the hydrogenation process was performed through measurement of hydrogen absorption. Once the percentage hydrogenation reached 99.4±0.2%, the reaction mixture was cooled to quench the hydrogenation. Next, this batch was depressurized. Nitrogen was then passed so as to remove remaining hydrogen. After the hydrogenation reaction had ended, 0.2 parts of activated carbon having an average diameter of 15 µm was added into the reactor and was stirred for 30 minutes. Thereafter, filtration was carried out using a filter having a pore diameter of 5 µm. Steam was introduced into the filtrate, and monochlorobenzene was removed and recovered through steam distillation. Precipitated hydrogenated product was recovered by separation and drying. The obtained hydrogenated polymer was dissolved in a specific amount of NMP to obtain an NMP solution having the hydrogenated polymer dissolved with a solid content concentration of 8% in NMP.

Comparative Example 3

Various operations and evaluations were performed in the same way as in Example 1 with the exception that in production of the polymer, an antioxidant was not compounded, the polymerization temperature was changed to 60° C., and the drying temperature was changed to 120° C. such that a polymer satisfying a value (A) for volume-average particle diameter D50 and a value (B) for a specific particle diameter indicated in Table 1 was obtained. The results are shown in Table 1. The viscosity of the conductive material dispersion liquid produced in this example, measured as previously described, was at least 50 Pa·s (exceeding device limit of detection).

Comparative Example 4

Various operations and evaluations were performed in the same way as in Example 1 with the exception that in preparation of the surface-treated CNTs, CNTs having a specific surface area of 110 m²/g were used as feedstock CNTs, and these CNTs were subjected to 1 hour of acid treatment and 40 minutes of base treatment. The results are shown in Table 1. The viscosity of the conductive material dispersion liquid produced in this example, measured as previously described, was at least 50 Pa·s.

In Table 1, shown below:
"AN" indicates acrylonitrile monomer;
"BD" indicates butadiene monomer;
"BHT" indicates dibutylhydroxytoluene; and
"CNT" indicates carbon nanotubes.

TABLE 1

| | | Examples | | | | | | | | | | Comparative examples | | | |
|---|---|---|---|---|---|---|---|---|---|---|---|---|---|---|---|
| | | 1 | 2 | 3 | 4 | 5 | 6 | 7 | 8 | 9 | 10 | 1 | 2 | 3 | 4 |
| Absolute value of zeta potential (mV) | | 5 | 7 | 11 | 8 | 12 | 20 | 25 | 3 | 13 | 16 | 33 | 33 | 40 | 31 |
| Monomer composition | Nitrile group-containing monomer (AN, parts by mass) | 35 | 35 | 12 | 55 | 35 | 35 | 35 | 35 | 35 | 35 | 35 | 35 | 35 | 35 |
| | Conjugated diene monomer (BD, parts by mass) | 65 | 65 | 88 | 45 | 65 | 65 | 65 | 65 | 65 | 65 | 65 | 65 | 65 | 65 |
| Dispersant (polymer) | Inclusion of nitrile group-containing monomer unit | Yes | Yes | Yes | Yes | Yes | Yes | Yes | Yes | Yes | Yes | Yes | Yes | Yes | Yes |
| | Inclusion of alkylene structural unit | Yes | Yes | Yes | Yes | Yes | Yes | Yes | Yes | Yes | Yes | Yes | Yes | Yes | Yes |
| | Value (B) for particle diameter of largest peak in range of not less than 5 µm and not more than 30 µm (µm) | 12 | 9 | 12 | 12 | 12 | 18 | 18 | 12 | 12 | 12 | No peak | No peak | 25 | 12 |
| | Value (A) for volume-average particle diameter D50 (nm) | 300 | 250 | 200 | 500 | 250 | 500 | 600 | 80 | 300 | 300 | 200 | 200 | 900 | 300 |
| Conductive material (CNT) | Iodine value (mg/100 mg) | 5 | 5 | 5 | 5 | 55 | 5 | 5 | 5 | 5 | 5 | 5 | 5 | 5 | 5 |
| | Surface base content (mmol/g) | 0.05 | 0.05 | 0.05 | 0.05 | 0.05 | 0.05 | 0.05 | 0.05 | 0.01 | 0.05 | 0.05 | 0.05 | 0.05 | 0.008 |
| | Surface acid content/Surface base content (-) | 0.3 | 0.3 | 0.3 | 0.3 | 0.3 | 0.3 | 0.3 | 0.3 | 0.3 | 0.9 | 0.3 | 0.3 | 0.3 | 2.4 |
| | BET specific surface area (m²/g) | 300 | 300 | 300 | 300 | 300 | 300 | 300 | 300 | 300 | 300 | 300 | 300 | 300 | 110 |
| Adsorbed amount (X) of dispersant to conductive material | | 0.8 | 0.7 | 0.6 | 0.7 | 0.6 | 0.5 | 0.45 | 0.9 | 0.6 | 0.6 | 0.3 | 0.2 | 0.1 | 0.3 |
| Substituted phenol compound | Type | BHT | BHT | BHT | BHT | BHT | BHT | BHT | BHT | BHT | BHT | — | BHT | — | BHT |
| | Content (mass %; based on polymer) | 0.1 | 0.2 | 0.1 | 0.1 | 0.1 | 0.1 | 0.1 | 0.1 | 0.1 | 0.1 | — | 0.25 | — | 0.1 |
| Evaluation | Stability over time of conductive material dispersion liquid | A | B | C | A | B | B | B | A | B | B | C | D | D | D |
| | Output characteristics | A | A | A | B | B | C | C | A | B | B | D | D | D | D |
| | High-temperature storage characteristics | A | A | B | A | B | A | B | A | A | A | B | C | D | D |

It can be seen from Table 1 that the conductive material dispersion liquids of Examples 1 to 10, which each contained a conductive material, a dispersant that was a polymer including a nitrile group-containing monomer unit and an alkylene structural unit, and an organic solvent and which each had a zeta potential absolute value within a range of 30 mV or less, had excellent dispersion state stability over time and could enhance rate characteristics and high-temperature storage characteristics of an obtained electrochemical device.

In contrast, it can be seen that the conductive material dispersion liquids of Comparative Examples 1 to 4, which each had a zeta potential absolute value of more than 30 mV, had poor dispersion state stability over time and could not provide a balance of high levels of both rate characteristics and high-temperature storage characteristics in an obtained electrochemical device.

INDUSTRIAL APPLICABILITY

According to the present disclosure, it is possible to provide a conductive material dispersion liquid for an electrochemical device that has excellent dispersion state stability over time and that can enhance rate characteristics and high-temperature storage characteristics of an obtained electrochemical device.

Moreover, according to the present disclosure, it is possible to provide a slurry composition for an electrochemical device electrode, and method of producing the same, that can enhance rate characteristics and high-temperature storage characteristics of an obtained electrochemical device.

Furthermore, according to the present disclosure, it is possible to provide an electrode for an electrochemical device that can sufficiently improve rate characteristics and high-temperature storage characteristics of an electrochemical device and an electrochemical device that has excellent rate characteristics, high-temperature storage characteristics, and so forth.

The invention claimed is:

1. A conductive material dispersion liquid for an electrochemical device comprising a conductive material, a dispersant, and a solvent, wherein
the conductive material dispersion liquid for an electrochemical device has a zeta potential absolute value within a range of 30 mV or less,
the dispersant is a polymer including a nitrile group-containing monomer unit and an alkylene structural unit,
the solvent is an organic solvent, and
the conductive material dispersion liquid for an electrochemical device further comprises not less than 0.01 mass % and not more than 0.2 mass % of a substituted phenol compound based on total mass of the polymer.

2. The conductive material dispersion liquid for an electrochemical device according to claim 1, wherein
an adsorbed amount (X) of the dispersant to the conductive material calculated by formula (1), shown below:

$$\text{adsorbed amount } (X) \, [\text{mg/m}^2] = \text{mass } (A) \text{ of dispersant adsorbed to conductive material [mg]/total mass } (B) \text{ of conductive material [mg]} \times 1000 / \text{specific surface area } (S) \text{ of conductive material } [\text{m}^2/\text{g}] \quad (1)$$

satisfies a relationship: $0.4 \leq$ adsorbed amount $(X) \leq 1$.

3. The conductive material dispersion liquid for an electrochemical device according to claim 1, wherein proportional content of the nitrile group-containing monomer unit in the polymer is not less than 10 mass % and not more than 60 mass %.

4. The conductive material dispersion liquid for an electrochemical device according to claim 1, wherein
the polymer is a polymer for which, upon measurement by dynamic light scattering, a value (A) detected for volume-average particle diameter D50 is not less than 50 nm and not more than 800 nm, and one or more peaks are detected in a particle diameter range of not less than 5 μm and not more than 30 μm.

5. The conductive material dispersion liquid for an electrochemical device according to claim 1, wherein the conductive material includes one or more carbon nanotubes having a surface base content of not less than 0.01 mmol/g and not more than 0.10 mmol/g and having a ratio of surface acid content relative to the surface base content of not less than 0.1 and not more than 1.0.

6. A slurry composition for an electrochemical device electrode comprising: an electrode active material; and the conductive material dispersion liquid for an electrochemical device according to claim 1.

7. A method of producing the slurry composition for an electrochemical device electrode according to claim 6, comprising:
a first step of mixing the polymer, the conductive material, and the solvent to produce a conductive material dispersion liquid; and
a second step of mixing the conductive material dispersion liquid obtained in the first step and the electrode active material.

8. An electrode for an electrochemical device comprising an electrode mixed material layer formed using the slurry composition for an electrochemical device electrode according to claim 6.

9. An electrochemical device comprising the electrode for an electrochemical device according to claim 8.

* * * * *